US008952952B2

(12) United States Patent
Ebisuno et al.

(10) Patent No.: US 8,952,952 B2

(45) **Date of Patent: *Feb. 10, 2015**

(54) DISPLAY DEVICE

(75) Inventors: Kouhei Ebisuno, Kyoto (JP); Toshiyuki Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 2 days.

This patent is subject to a terminal disclaimer.

(21) Appl. No.: 13/493,229

(22) Filed: Jun. 11, 2012

(65) Prior Publication Data

US 2012/0320024 A1 Dec. 20, 2012

Related U.S. Application Data

(63) Continuation of application No. PCT/JP2011/003432, filed on Jun. 16, 2011.

(51) Int. Cl.

*G06F 1/26* (2006.01)
*G09G 3/32* (2006.01)

(52) U.S. Cl.

CPC ............ *G09G 3/3233* (2013.01); *G09G 3/3225* (2013.01); *G09G 2320/0204* (2013.01); *G09G 2320/0223* (2013.01); *G09G 2330/028* (2013.01); *G09G 2320/0233* (2013.01); *G09G 2320/029* (2013.01)

USPC .......................................................... 345/212

(58) Field of Classification Search

USPC ....................... 313/495; 345/76, 77, 211, 212

See application file for complete search history.

(56) References Cited

U.S. PATENT DOCUMENTS

| | | | |
|---|---|---|---|
| 6,518,962 | B2 | 2/2003 | Kimura et al. |
| 7,362,322 | B2 | 4/2008 | Kimura et al. |
| 7,864,172 | B2 | 1/2011 | Miyake et al. |
| 7,973,745 | B2 | 7/2011 | Mizukoshi et al. |
| 8,547,307 | B2 | 10/2013 | Shirouzu et al. |
| 2001/0043168 | A1 | 11/2001 | Koyama et al. |
| 2002/0180721 | A1 | 12/2002 | Kimura et al. |

(Continued)

FOREIGN PATENT DOCUMENTS

| | | |
|---|---|---|
| EP | 2284825 | 2/2011 |
| JP | 2003-280590 | 10/2003 |

(Continued)

OTHER PUBLICATIONS

Search report from Japan—PCT/JP2010/000149, mail date is Feb. 9, 2010.

(Continued)

*Primary Examiner* — Dwayne Bost
*Assistant Examiner* — Sepehr Azari
(74) *Attorney, Agent, or Firm* — Greenblum & Bernstein P.L.C.

(57) ABSTRACT

A display device according to the present disclosure includes: a variable-voltage source which outputs a high-side output potential and a low-side output potential; an organic electroluminescence (EL) display unit in which a plurality of pixels are arranged; a potential difference detecting circuit which detects a high-side potential of a first pixel and a low-side potential of a second pixel; and a signal processing circuit which regulates at least one of the high-side output potential and the low-side output potential outputted from the variable-voltage source such that a potential difference between the high-side potential of the first pixel and the low-side potential of the second pixel reaches a predetermined potential difference.

13 Claims, 22 Drawing Sheets

(56) References Cited

U.S. PATENT DOCUMENTS

| | | | |
|---|---|---|---|
| 2003/0063081 A1 | 4/2003 | Kimura et al. | |
| 2004/0070331 A1 | 4/2004 | Kuno et al. | |
| 2006/0038501 A1 | 2/2006 | Koyama et al. | |
| 2006/0077137 A1 | 4/2006 | Kwon | |
| 2006/0176253 A1 | 8/2006 | Yazawa et al. | |
| 2007/0080905 A1 | 4/2007 | Takahara | |
| 2008/0186297 A1 | 8/2008 | Morita | |
| 2008/0266216 A1* | 10/2008 | Choi | 345/77 |
| 2008/0291135 A1 | 11/2008 | Kim et al. | |
| 2008/0297055 A1 | 12/2008 | Miyake et al. | |
| 2009/0026969 A1 | 1/2009 | Joo | |
| 2009/0207106 A1 | 8/2009 | Mizukoshi et al. | |
| 2009/0303162 A1 | 12/2009 | Kohno et al. | |
| 2010/0110059 A1 | 5/2010 | Kang et al. | |
| 2010/0214273 A1 | 8/2010 | Shirouzu et al. | |
| 2010/0259528 A1 | 10/2010 | Smith et al. | |
| 2011/0025586 A1 | 2/2011 | Lee | |
| 2011/0157134 A1 | 6/2011 | Ogura | |
| 2011/0169798 A1 | 7/2011 | Lee et al. | |
| 2011/0242087 A1 | 10/2011 | Ebisuno et al. | |
| 2013/0285889 A1 | 10/2013 | Shirouzu et al. | |

FOREIGN PATENT DOCUMENTS

| | | |
|---|---|---|
| JP | 2004-246250 | 9/2004 |
| JP | 2006-065148 | 3/2006 |
| JP | 2006-251602 | 9/2006 |
| JP | 2008-268914 | 11/2008 |
| JP | 2008-299019 | 12/2008 |
| JP | 2009-198691 | 9/2009 |
| JP | 2009-294376 | 12/2009 |
| JP | 2010-199501 | 9/2010 |
| WO | 98/40871 | 9/1998 |
| WO | 2010/001590 | 1/2010 |
| WO | 2011/086597 | 7/2011 |

OTHER PUBLICATIONS

Search report from Japan—PCT/JP2011/003424, mail date is Sep. 27, 2011.

Search report from Japan—PCT/JP2011/003432, mail date is Sep. 27, 2011.

Search report from Japan—PCT/JP2011/003609, mail date is Sep. 20, 2011.

Search report from Japan—PCT/JP2011/003979, mail date is Aug. 16, 2011.

Search report from Japan—PCT/JP2011/003989, mail date is Aug. 9, 2011.

Office Action (in related U.S. Appl. No. 13/467,462) mail date is Aug. 28, 2013.

U.S.A. (U.S. Appl. No. 13/157,577) Office action, mail date is Sep. 11, 2013.

U.S.A. (U.S. Appl. No. 13/467,462) Office action, mail date is Feb. 24, 2014.

Search report from E.P.O., mail date is Jun. 17, 2014.

U.S.A. Office Action (U.S. Appl. No. 13/467,462), mail date is Aug. 13, 2014.

Japan Office action, mail date is Nov. 26, 2013.

Extended European Search Report, mail date is Oct. 9, 2014.

Search report from E.P.O., mail date is Oct. 29, 2014.

* cited by examiner

| Video data (Gradation level) | Required voltage (Red) | Required voltage (Green) | Required voltage (Blue) |
|---|---|---|---|
| 255 | 11.2 | 12.2 | 8.4 |

FIG. 7

| Potential difference value [V] | Voltage drop margin |
|---|---|
| 0.0 | 0.0 |
| 0.2 | 0.2 |
| 0.4 | 0.4 |
| 0.6 | 0.6 |
| ⋮ | ⋮ |
| 3.4 | 3.4 |
| 3.6 | 3.6 |
| ⋮ | ⋮ |
| 5.6 | 5.6 |
| 5.8 | 5.8 |
| 6.0 | 6.0 |

FIG. 13

| Video data (Gradation level) | Required voltage (Red) | Required voltage (Green) | Required voltage (Blue) |
|---:|---:|---:|---:|
| 0 | 4 | 4.2 | 3.5 |
| 1 | 4.1 | 4.3 | 3.5 |
| 2 | 4.1 | 4.4 | 3.6 |
| 3 | 4.2 | 4.5 | 3.6 |
| ⋮ | ⋮ | ⋮ | ⋮ |
| 176 | 8.3 | 9.6 | 6.7 |
| 177 | 8.5 | 9.9 | 6.9 |
| ⋮ | ⋮ | ⋮ | ⋮ |
| 253 | 10.5 | 11.4 | 8.2 |
| 254 | 10.8 | 11.8 | 8.3 |
| 255 | 11.2 | 12.2 | 8.4 |

DISPLAY DEVICE

CROSS REFERENCE TO RELATED APPLICATION

This is a continuation application of PCT Patent Application No. PCT/JP2011/003432 filed on Jun. 16, 2011, designating the United States of America. The entire disclosure of the above-identified application, including the specification, drawings and claims is incorporated herein by reference in its entirety.

TECHNICAL FIELD

Devices consistent with exemplary embodiments relate to active-matrix display devices which use current-driven luminescence elements represented by organic electroluminescence (EL) elements, and more particularly to a display device having excellent power consumption reducing effect.

BACKGROUND ART

In general, the luminance of an organic electroluminescence (EL) element is dependent upon the drive current supplied to the element, and the luminance of the luminescence of the element increases in proportion to the drive current. Therefore, the power consumption of displays made up of organic EL elements is determined by the average of display luminance. Specifically, unlike liquid crystal displays, the power consumption of organic EL displays varies significantly depending on the displayed image.

For example, in an organic EL display, the highest power consumption is required when displaying an all-white image, whereas, in the case of a typical natural image, power consumption which is approximately 20 to 40% that for all-white is considered to be sufficient.

However, because power source circuit design and battery capacity entail designing which assumes the case where the power consumption of a display becomes highest, it is necessary to consider power consumption that is 3 to 4 times that for the typical natural image, and thus becoming a hindrance to the lowering of power consumption and the miniaturization of devices.

Consequently, there is conventionally proposed a technique which suppresses power consumption with practically no drop in display luminance, by detecting the peak value of video data and adjusting the cathode voltage of the organic EL elements based on such detected data so as to reduce power source voltage (for example, see Patent Literature 1).

CITATION LIST

Patent Literature

[Patent Literature 1] Japanese Unexamined Patent Application Publication No. 2006-065148

SUMMARY OF INVENTION

Technical Problem

Now, since an organic EL element is a current-driven element, current flows through a power source wire and a voltage drop which is proportionate to the wire resistance occurs. As such, the power supply voltage to be supplied to the display is set by adding a voltage drop margin for compensating for a voltage drop. In the same manner as the previously described power source circuit design and battery capacity, since the power drop margin for compensating for a voltage drop is set assuming the case where the power consumption of the display becomes highest, unnecessary power is consumed for typical natural images.

In a small-sized display intended for mobile device use, panel current is small and thus, compared to the voltage to be consumed by pixels, the power drop margin for compensating for a voltage drop is negligibly small. However, when current increases with the enlargement of panels, the voltage drop occurring in the power source wire no longer becomes negligible.

However, in the conventional technique in the above-mentioned Patent Literature 1, although power consumption in each of the pixels can be reduced, the power drop margin for compensating for a voltage drop cannot be reduced, and thus the power consumption reducing effect for household large-sized display devices of 30-inches and above is insufficient.

One or more exemplary embodiments are conceived in view of the aforementioned problem and provide a display device having excellent power consumption reducing effect.

Solution to Problem

In one general aspect, the techniques disclosed here feature a display device which includes: a power supplying unit configured to output a high-side output potential and a low-side output potential; a display unit in which a plurality of pixels are arranged and which receives power supply from the power supplying unit; a voltage detecting unit configured to detect a high-side applied potential applied to a first pixel in the display unit and a low-side applied potential applied to a second pixel in the display unit, the second pixel being different from the first pixel; and a voltage regulating unit configured to regulate at least one of the high-side output potential and the low-side output potential outputted from the power supplying unit such that a potential difference between the high-side applied potential and the low-side applied potential reaches a predetermined potential difference.

Advantageous Effects of Invention

One or more exemplary embodiments of the present disclosure enable the implementation of a display device having excellent power consumption reducing effect.

BRIEF DESCRIPTION OF DRAWINGS

These and other aspects will become apparent from the following description thereof taken in conjunction with the accompanying drawings that illustrate a specific embodiment of the present disclosure. In the Drawings:

FIG. 7 is a chart showing an example of a voltage margin conversion table;

FIG. 13 is a chart showing an example of a required voltage conversion table according to Embodiment 2;

DESCRIPTION OF EMBODIMENT(S)

Figure 1:
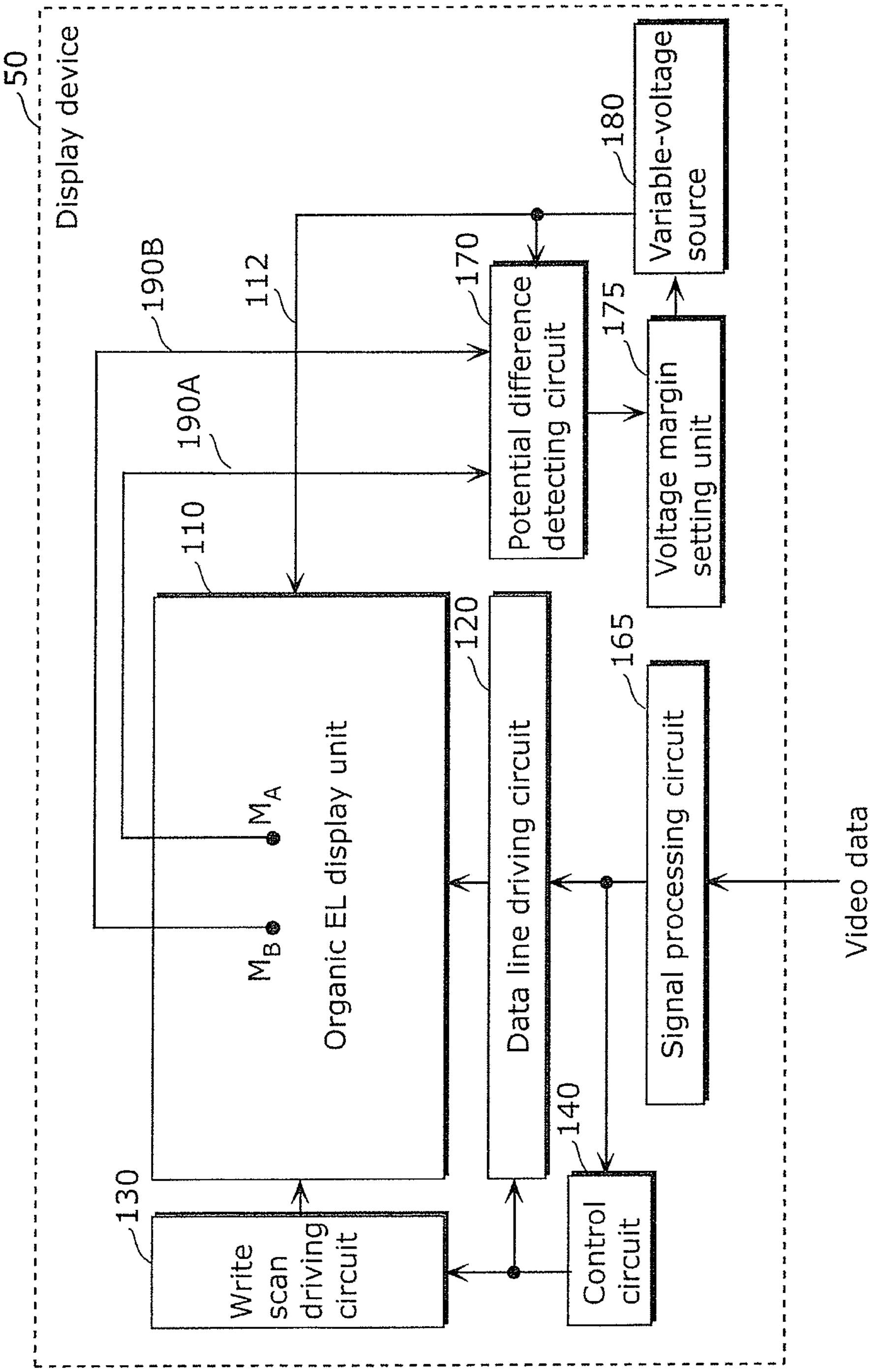
FIG. 1 is a block diagram showing an outline configuration of a display device according to Embodiment 1 of the present disclosure.

The display device according to an exemplary embodiment disclosed here includes: a power supplying unit configured to output a high-side output potential and a low-side output potential; a display unit in which a plurality of pixels are arranged and which receives power supply from the power supplying unit; a voltage detecting unit configured to detect a high-side applied potential applied to a first pixel in the display unit and a low-side applied potential applied to a second pixel in the display unit, the second pixel being different from the first pixel; and a voltage regulating unit configured to regulate at least one of the high-side output potential and the low-side output potential outputted from the power supplying unit such that a potential difference between the high-side applied potential and the low-side applied potential reaches a predetermined potential difference.

Accordingly, by regulating at least one of the high-side output potential of the power supplying unit and the low-side output potential of the power supplying unit in accordance with the amount of voltage drop occurring from the power supplying unit to at least one pixel, power consumption can be reduced. Furthermore, when the voltage drop distribution of the high-side potential power source line and the voltage drop (rise) distribution of the low-side potential power source line are different, the output potential of the power supplying unit can be regulated based on potential information from different pixels, and thus power consumption can be reduced more effectively.

Furthermore, for example, at least one of (i) the number of pixels for which the voltage detecting unit detects the high-side applied potential and (ii) the number of pixels for which the voltage detecting unit detects the low-side applied potential may be plural.

Furthermore, for example, the voltage regulating unit may be configured to: select at least one applied potential from among: a lowest applied potential among high-side applied potentials detected by the voltage detecting unit; and a highest applied potential among low-side applied potentials detected by the voltage detecting unit; and regulate the power supplying unit based on the selected at least one applied potential.

Accordingly, when one of the high-side potential and the low-side potential that are detected is plural in number, it is possible to select the lowest or highest potential among the plural detected potentials. Therefore, the output potential from the power supplying unit can be more accurately regulated. Therefore, power consumption can be effectively reduced even when the size of the display unit is increased.

Furthermore, for example, a display device according to an exemplary embodiment may further include at least one of: a high-side potential detecting line having one end connected to the first pixel and the other end connected to the voltage detecting unit, for transmitting the high-side applied potential to the voltage detecting unit; and a low-side potential detecting line having one end connected to the second pixel and the other end connected to the voltage detecting unit, for transmitting the low-side applied potential to the voltage detecting unit.

Accordingly, the voltage detecting unit can measure at least one of the high-side potential applied to the first pixel and the low-side potential applied to the second pixel.

Furthermore, for example, the voltage detecting unit may be further configured to detect at least one of the high-side output potential and the low-side output potential which are outputted by the power supplying unit, and the voltage regulating unit may be configured to receive inputs of a power source potential difference which is a potential difference between the high-side output potential and the low-side output potential and a pixel potential difference which is a potential difference between the high-side applied potential and the low-side applied potential, and regulate at least one of the high-side output potential and the low-side output potential in accordance with a potential difference between the power source potential difference and the pixel potential difference, the high-side output potential and the low-side output potential being outputted by the power supplying unit, the high-side applied potential being applied to the first pixel, and the low-side applied potential being applied to the second pixel.

Accordingly, since the voltage detecting unit can actually measure the voltage drop amount from the power supplying unit up to a predetermined pixel, at least one of the high-side output potential of the power supplying unit and the low-side output potential of the power supplying unit can be set to an optimal potential that is in accordance with the voltage drop amount measured by the voltage detecting unit.

Furthermore, for example, the voltage regulating unit may be configured to regulate the power supplying unit so that (i) the potential difference between the power source potential difference and the pixel potential difference and (ii) the power source potential difference are in an increasing function relationship.

Furthermore, for example, the voltage detecting unit may be further configured to detect at least one of (i) a potential in a high-side potential current path connecting the power supplying unit and a high potential side of the pixels and (ii) a potential in a low-side potential current path connecting the power supplying unit and the low potential side of the pixels; and the voltage regulating unit may be configured to regulate at least one of the high-side output potential and the low-side output potential that are outputted from the power supplying unit, in accordance with a first potential difference which is at least one of (i) a potential difference between the potential in the high-side potential current path and the high-side applied potential applied to the first pixel and (ii) a potential difference between the potential in the low-side potential current path and the low-side applied potential applied to the second pixel.

Accordingly, the output voltage from the power supplying unit can be regulated in accordance with the voltage drop amount within the display region only, by detecting the potential difference between the voltage applied to the pixels and the voltage in the wiring path outside the display region.

Furthermore, for example, the voltage regulating unit may be configured to regulate the power supplying unit so that the power source potential difference and the first potential difference are in an increasing function relationship.

Furthermore, for example, each of the pixels may include: a driving element having a source electrode and a drain electrode; and a luminescence element having a first electrode and a second electrode, the first electrode being connected to one of the source electrode and the drain electrode of the driving element, the high-side applied potential may be applied to one of the second electrode and the other of the source electrode and the drain electrode, and the low-side applied potential may be applied to the other of the second electrode and the other of the source electrode and the drain electrode.

Furthermore, for example, the pixels may be arranged in rows and columns; the display device may further include a first power source line and a second power source line, the first power source line connecting the others of the source electrode and the drain electrode of the respective driving elements of adjacent pixels in at least one of the row direction and the column direction, and the second power source line connecting the second electrodes of the respective luminescence elements of adjacent pixels in the row direction and the column direction; and the pixels may receive the power supply from the power supplying unit via the first power source line and the second power source line.

Furthermore, for example, the second electrode and the second power source line may be part of a common electrode that is common to the pixels, and may be electrically connected to the power supplying unit so that a potential is applied to the common electrode from a periphery of the common electrode.

Accordingly, although the voltage drop amount becomes larger towards the vicinity of the center of the display unit, the high-side output potential of the power supplying unit and the low-side output potential of the power supplying unit can be appropriately regulated particularly when the size of the display unit is increased, and thus power consumption can be further reduced.

Furthermore, for example, the second electrode may comprise a transparent conductive material including a metal oxide.

Furthermore, for example, the luminescence element may be an organic electroluminescence (EL) element.

Accordingly, since heat generation can be suppressed through the reduction of power consumption, the deterioration of the organic EL element can be suppressed.

Hereinafter, exemplary embodiments of the present disclosure shall be described based on the Drawings. It is to be noted that, in all the figures, the same reference numerals are given to the same or corresponding elements and redundant description thereof shall be omitted.

Embodiment 1

A display device according to this embodiment includes: a variable-voltage source which outputs a high-side output potential and a low-side output potential; an organic electroluminescence (EL) display unit in which a plurality of pixels are arranged and which receives power supply from the variable-voltage source; a voltage detecting unit which detects a high-side applied potential applied to a first pixel in the organic EL display unit and a low-side applied potential applied to a second pixel in the display unit that is different from the first pixel; and a signal processing circuit which regulates at least one of the high-side output potential and the low-side output potential outputted from the variable-voltage source such that a potential difference between the high-side applied potential of the first pixel and the low-side applied potential of the second pixel reaches a predetermined potential difference.

Accordingly, the display device according to this embodiment realizes excellent power consumption reducing effect.

Hereinafter, Embodiment 1 of the present disclosure shall be specifically described with reference to the Drawings.

FIG. 1 is a block diagram showing an outline configuration of the display device according to Embodiment 1 of the present disclosure.

A display device 50 shown in the figure includes an organic electroluminescence (EL) display unit 110, a data line driving circuit 120, a write scan driving circuit 130, a control circuit 140, a signal processing circuit 165, a potential difference detecting circuit 170, a voltage margin setting unit 175, a variable-voltage source 180, and monitor wires 190 and 190B.

Figure 2:
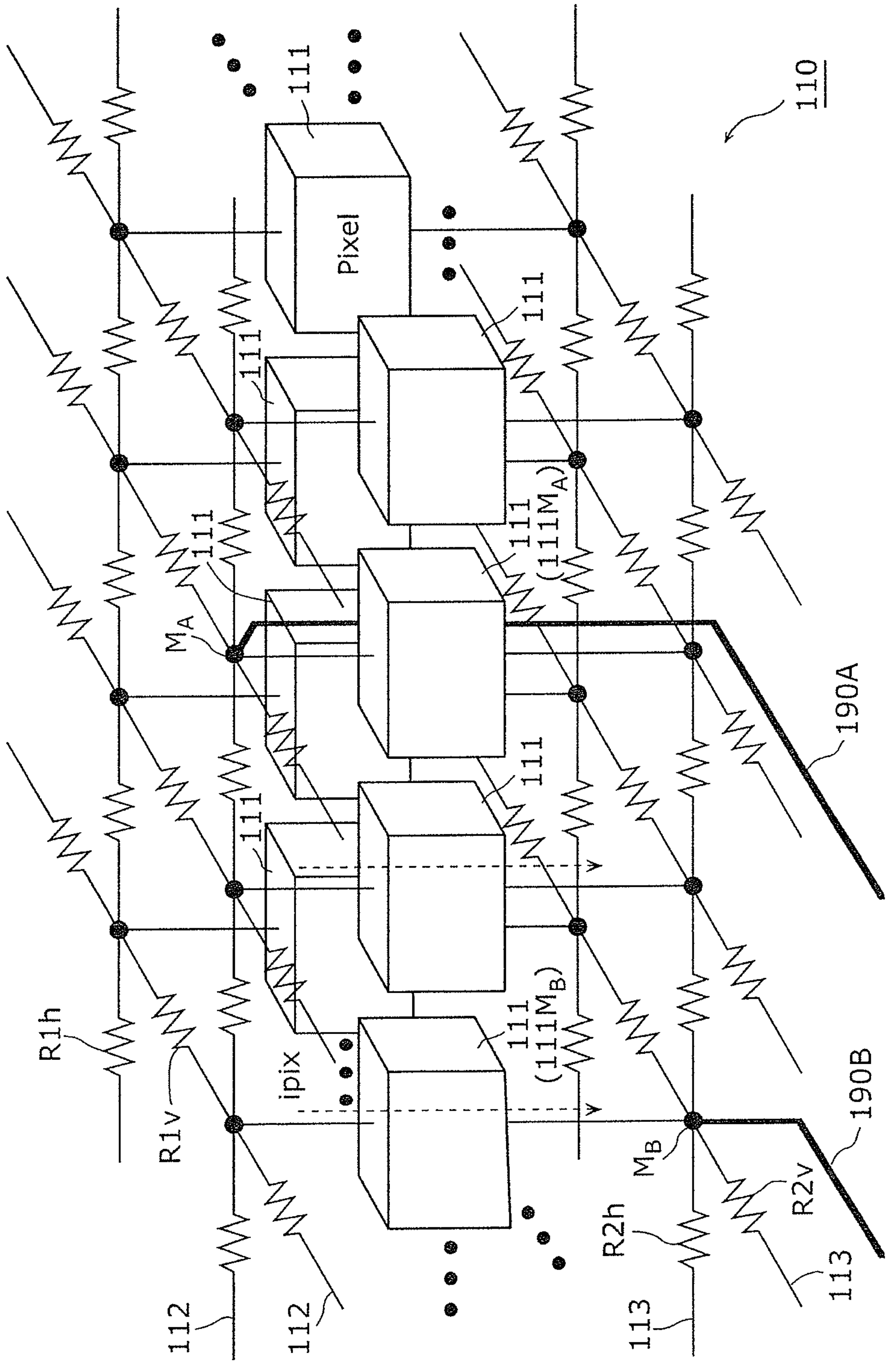
FIG. 2 is a perspective view schematically showing a configuration of an organic EL display unit according to Embodiment 1.

FIG. 2 is a perspective view schematically showing a configuration of the organic EL display unit 110 according to Embodiment 1. It is to be noted that the lower portion of the figure is the display screen side.

As shown in the figure, the organic EL display unit 110 includes pixels 111, a first power source wire 112, and a second power source wire 113.

Each pixel 111 is connected to the first power source wire 112 and the second power source wire 113, and produces luminescence at a luminance that is in accordance with a pixel current that flows to the pixel 111. At least one predetermined pixel out of the pixels 111 is connected to the monitor wire 190A at a high-side potential detecting point $M_A$. Furthermore, at least one predetermined pixel out of the pixels 111 is connected to the monitor wire 190B at a low-side potential detecting point $M_B$. Hereinafter, the pixel 111 that is directly connected to the monitor wire 190A shall be denoted as the monitor pixel $111M_A$, and the pixel 111 that is directly connected to the monitor wire 190B shall be denoted as the monitor pixel $111M_B$.

The first power source wire 112 is arranged in a net-like manner to correspond to pixels 111 that are arranged in a matrix (in rows and columns), and is electrically connected to the variable-voltage source 180 disposed at the periphery of the organic EL display unit 110. Through the outputting of a high-side power source potential from the variable-voltage source 180, a potential corresponding to the high-side power source potential outputted from the variable-voltage source 180 is applied to the first power source wire 112. On the other hand, the second power source wire 113 is formed in the form of a continuous film on the organic EL display unit 110, and is electrically connected to the variable-voltage source 180. Through the outputting of a low-side power source potential from the variable-voltage source 180, a potential corresponding to the low-side power source potential outputted from the variable-voltage source 180 is applied to the second power source wire 113. In FIG. 2, the first power source wire 112 and the second power source wire 113 are schematically illustrated in mesh-form in order to show the resistance components of the first power source wire 112 and the second power source wire 113. It is to be noted that the second power source wire 113 may be grounded to, for example, a common grounding potential of the display device 50, at the periphery of the organic EL display unit 110.

A horizontal first power source wire resistance $R1h$ and a vertical first power source wire resistance $R1v$ are present in the first power source wire 112. A horizontal second power source wire resistance $R2h$ and a vertical second power source wire resistance $R2v$ are present in the second power source wire 113. It is to be noted that, although not illustrated, each of the pixels 111 is connected to the write scan driving circuit 130 and the data line driving circuit 120, and is also connected to a scanning line for controlling the timing at which the pixel produces luminescence and stops producing luminescence, and to a data line for supplying signal voltage corresponding to the luminescence luminance of the pixel 111.

The optimal position of the monitor pixels $111M_A$ and $111M_B$ is determined depending on the wiring method of the first power source wire 112 and the second power source wire 113, the respective values of the first power source wire resistances $R1h$ and $R1v$, and the respective values of the second power source wire resistances $R2h$ and $R2v$. In this embodiment, the high-side potential detecting point $M_A$ and the low-side potential detecting point $M_B$ are disposed in mutually different pixels. This allows optimization of the detection points and eliminates the need for disposing a detection point at an unnecessary location, and thus enabling the total number of detection points to be reduced. For example, the pixel $111M_A$ is disposed in a luminescence producing region in which there is a tendency for a large high-side potential voltage drop, and the pixel $111M_B$ is disposed in a luminescence producing region in which there is a tendency for a large low-side potential voltage drop (rise).

Figure 3A:
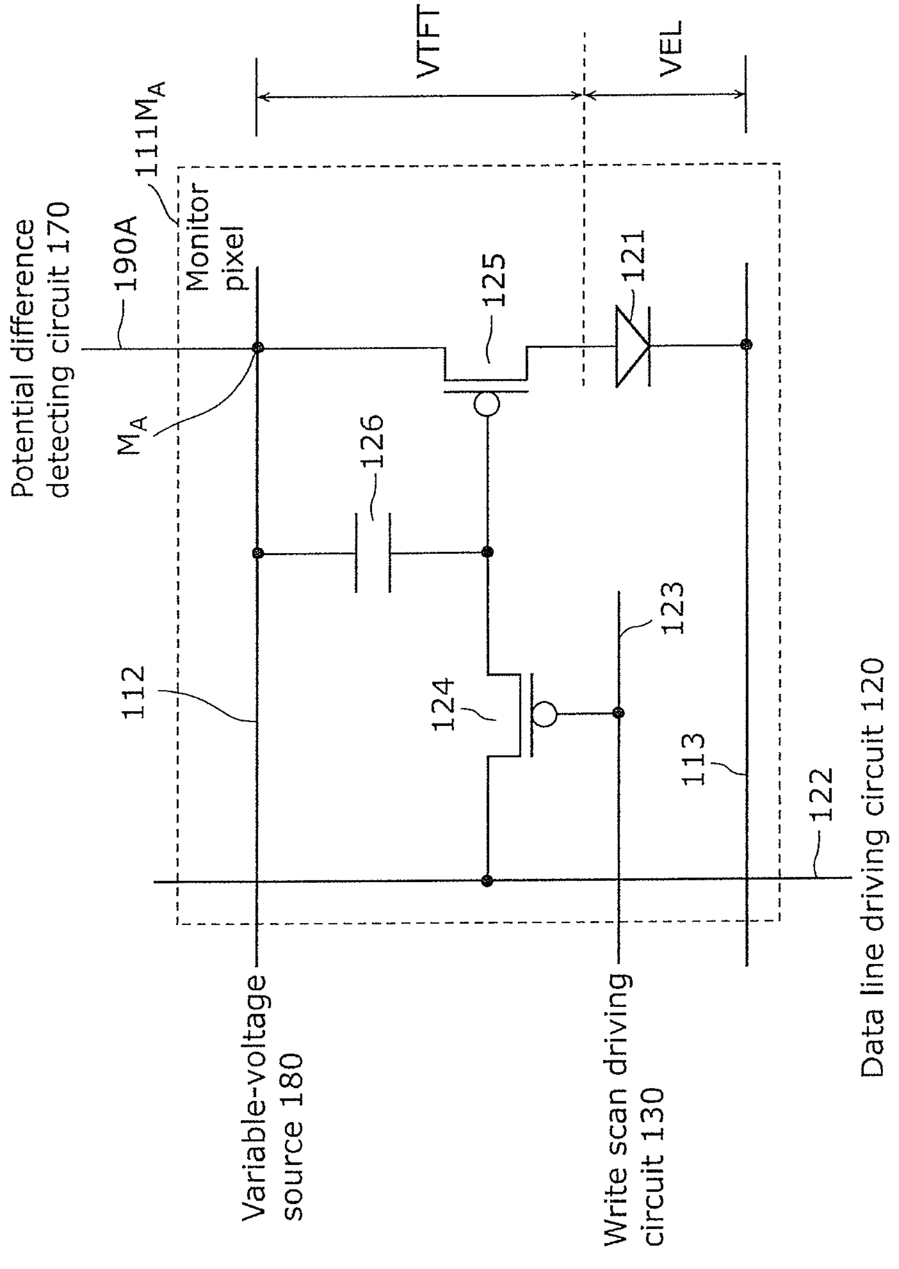
FIG. 3A is a diagram of the circuit configuration of a pixel connected to a high-side potential monitor wire.
Figure 3B:
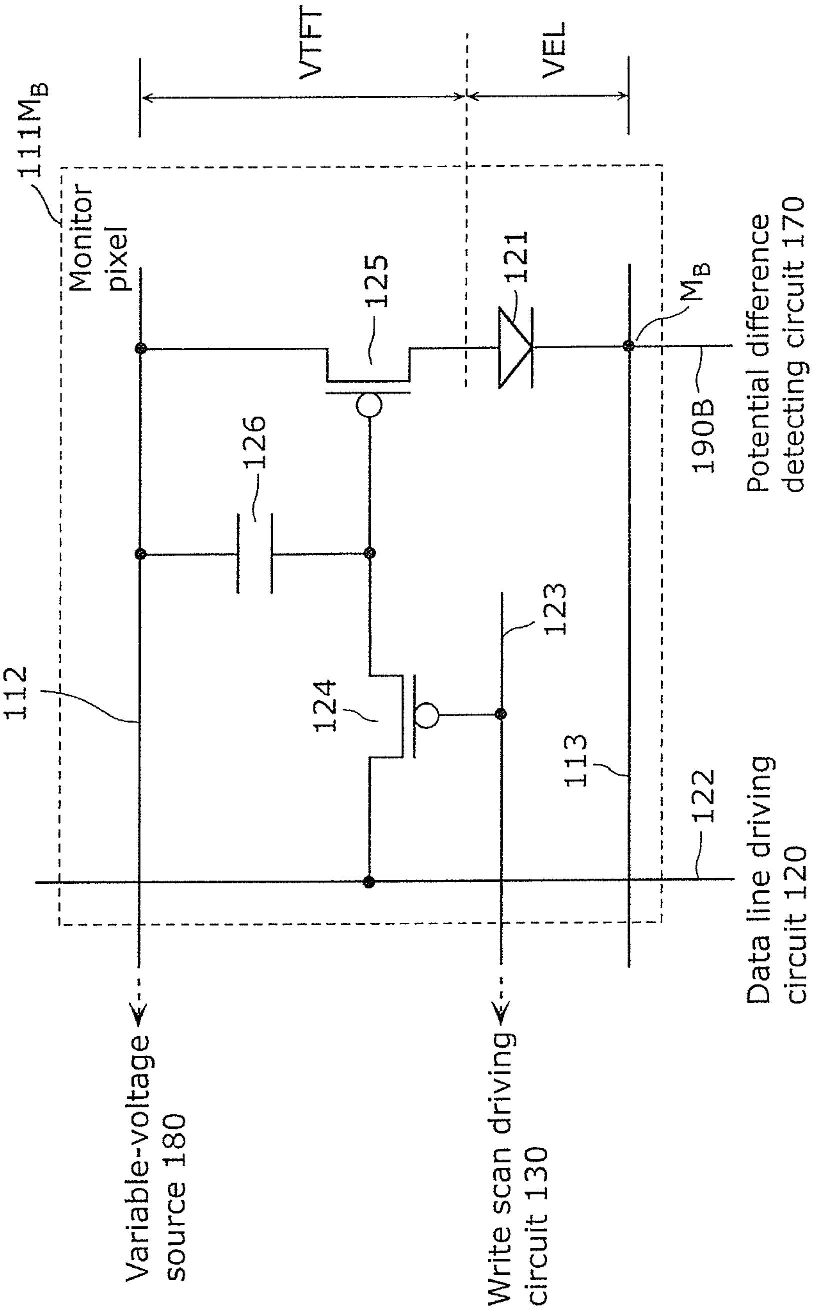
FIG. 3B is a diagram of the circuit configuration of a pixel connected to a low-side potential monitor wire.

FIG. 3A is a diagram of the circuit configuration of the pixel $111M_A$ connected to the high-side potential monitor wire 190A, and FIG. 3B is a diagram of the circuit configuration of the pixel $111M_B$ connected to the low-side potential monitor wire 190A. Each of the pixels arranged in a matrix includes a driving element and a luminescence element. The driving element includes a source electrode and a drain electrode. The luminescence element includes a first electrode and a second electrode. The first electrode is connected to one of the source electrode and the drain electrode of the driving element. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a switch transistor 124, a driving transistor 125, and a holding capacitor 126. Furthermore, in the monitor pixel $111M_A$, the monitor wire 190A is additionally connected to the other of the source electrode and the drain electrode of the drive element. In monitor pixel $111M_B$, the monitor wire 190B is additionally connected to the second electrode of the luminescence element. At least one each of the pixels $111M_A$ and $111M_B$ are disposed in the organic EL display unit 110.

The organic EL element 121 is a luminescence element having an anode electrode, which is a first electrode, connected to the drain electrode of the driving transistor 125 and a cathode electrode, which is a second electrode, connected to the second power source wire 113, and produces luminescence with a luminance that is in accordance with the pixel current $i_{pix}$ flowing between the anode electrode and the cathode electrode. The cathode electrode of the organic EL element 121 forms part of a common electrode provided in common to the plural pixels 111, and potential is applied to the common electrode from the periphery of the common electrode. Specifically, the common electrode functions as the second power source wire 113 in the organic EL display unit 110. Furthermore, the cathode electrode is formed from a transparent conductive material made of a metallic oxide.

The data line 122 is connected to the data line driving circuit 120 and one of the source electrode and the drain electrode of the switch transistor 124, and signal voltage corresponding to video data is applied to the data line 122 by the data line driving circuit 120.

The scanning line 123 is connected to the write scan driving circuit 130 and the gate electrode of the switch transistor 124, and switches between conduction and non-conduction of the switch transistor 124 according to the voltage applied by the write scan driving circuit 130.

The switch transistor 124 has one of a source electrode and a drain electrode connected to the data line 122, the other of the source electrode and the drain electrode connected to the gate electrode of the driving transistor 125 and one end of the holding capacitor 126, and is, for example, a P-type thin-film transistor (TFT).

The driving transistor 125 is a driving element having a source electrode connected to first power source wire 112, a drain electrode connected to the anode electrode of the organic EL element 121, and a gate electrode connected to the one end of the holding capacitor 126 and the other of the source electrode and the drain electrode of the switch transistor 124, and is, for example, a P-type TFT. With this, driving transistor 125 supplies the organic EL element 121 with current that is in accordance with the voltage held in the holding capacitor 126. Furthermore, in the monitor pixel $111M_A$, the source electrode of the driving transistor 125 is connected to the monitor wire 190A. On the other hand, in the monitor pixel $111M_B$, the cathode electrode of the organic EL element 121 is the cathode electrode of the pixel $111M_B$ and is connected to the monitor wire 190B.

The holding capacitor 126 has one end connected to the other of the source electrode and the drain electrode of the switch transistor 124, and the other end connected to the first power source wire 112, and holds the potential difference between the potential of the first power source wire 112 and the potential of the gate electrode of the driving transistor 125 when the switch transistor 124 becomes non-conductive. Specifically, the holding capacitor 126 holds a voltage corresponding to the signal voltage.

The functions of the respective constituent elements shown in FIG. 1 shall be described below with reference to FIG. 2, FIG. 3A, and FIG. 3B.

The data line driving circuit 120 outputs signal voltage corresponding to video data, to the pixels 111 via the data lines 122.

The write scan driving circuit 130 sequentially scans the pixels 111 by outputting a scanning signal to scanning lines 123. Specifically, the switch transistors 124 are switched between conduction and non-conduction on a per row basis. With this, the signal voltages outputted to the data lines 122 are applied to the pixels 111 in the row selected by the write scan driving circuit 130. Therefore, the pixels 111 produce luminescence with a luminance that is in accordance with the video data.

The control circuit 140 instructs the drive timing to each of the data line driving circuit 120 and the write scan driving circuit 130.

The signal processing circuit 165 outputs, to the data line driving circuit 120, a signal voltage corresponding to inputted video data.

The potential difference detecting circuit 170, which in this embodiment is the voltage detecting unit, measures the high-side potential applied to the monitor pixel 111$M_A$ and the low-side potential applied to the monitor pixel 111$M_B$. Specifically, the potential difference detecting circuit 170 measures, via the monitor wire 190A, the high-side potential applied to the monitor pixel 111$M_A$, and measures, via the monitor wire 190B, the low-side potential applied to the monitor pixel 111$M_B$. Subsequently, the potential difference detecting circuit 170 calculates the inter-pixel potential difference which is the potential difference between the high-side potential of the monitor pixel 111$M_A$ and the low-side potential of the monitor pixel 111$M_B$ that were measured. In addition, the potential difference detecting circuit 170 measures the output voltage of the variable-voltage source 180, and measures the potential difference ΔV between such output voltage and the calculated inter-pixel potential difference. Subsequently, the potential difference detecting circuit 170 outputs the measured potential difference ΔV to the voltage margin setting unit 175.

The voltage margin setting unit 175, which in this embodiment is the voltage regulating unit, regulates, based on a voltage (VEL+VTFT) at a peak gradation level and the potential difference ΔV detected by the potential difference detecting circuit 170, the variable-voltage source 180 so that the inter-pixel potential difference, which is the potential difference between the high-side potential of the monitor pixel 111$M_A$ and the low-side potential of the monitor pixel 111$M_B$, is set to a predetermined potential difference. Specifically, the voltage margin setting unit 175 calculates a voltage drop margin Vdrop based on the potential difference detected by the potential difference detecting circuit 170. Subsequently, the voltage margin setting unit 175 sums up the voltage (VEL+VTFT) at the peak gradation level and the voltage drop margin Vdrop, and outputs the summation result VEL+VTFT+Vdrop, as the potential of a first reference voltage Vref1A, to the variable-voltage source 180.

The variable-voltage source 180, which in this embodiment is the power supplying unit, outputs at least one of the high-side potential and the low-side potential to the organic EL display unit 110. The variable-voltage source 180 outputs an output voltage Vout for setting the inter-pixel potential difference detected from the monitor pixels 111$M_A$ and 111$M_B$ to the predetermined potential (VEL+VTFT), according to the first reference voltage Vref1A outputted by the voltage margin setting unit 175.

The monitor wire 190A is a high-side potential detecting wire which has one end connected to the monitor pixel 111$M_A$ and the other end connected to the potential difference detecting circuit 170, and transmits the high-side potential applied to the monitor pixel 111$M_A$ to the potential difference detecting circuit 170.

The monitor wire 190B is a low-side potential detecting wire which has one end connected to the monitor pixel 111$M_B$ and the other end connected to the potential difference detecting circuit 170, and transmits the low-side potential applied to the monitor pixel 111$M_B$ to the potential difference detecting circuit 170.

Next, a detailed configuration of the variable-voltage source 180 shall be briefly described.

Figure 4:
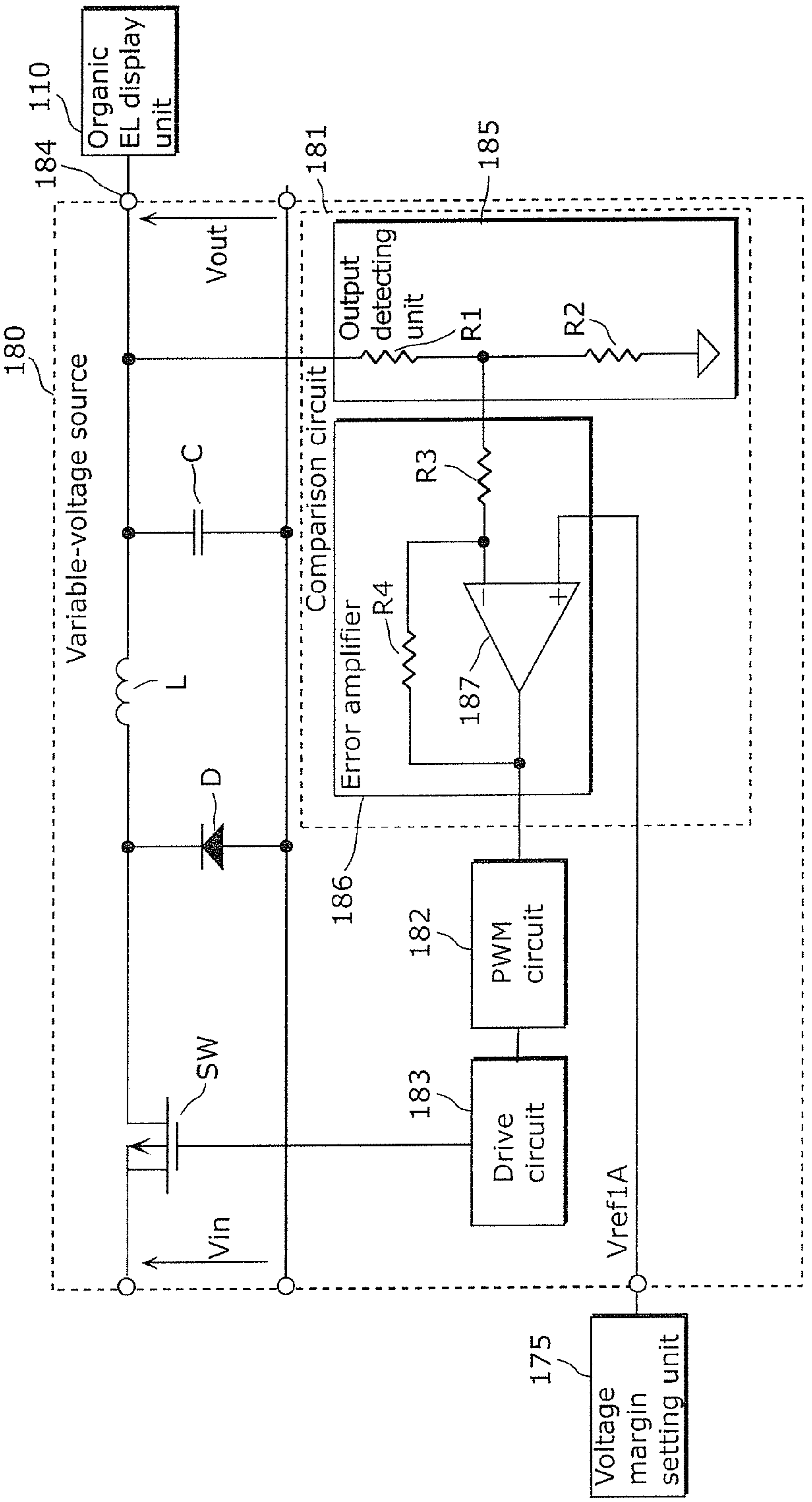
FIG. 4 is a block diagram showing an example of a specific configuration of a variable-voltage source according to Embodiment 1.

FIG. 4 is a block diagram showing an example of a specific configuration of a variable-voltage source according to Embodiment 1. It is to be noted that the organic EL display unit 110 and the voltage margin setting unit 175 which are connected to the variable-voltage source are also shown in the figure.

The variable-voltage source 180 shown in the figure includes a comparison circuit 181, a pulse width modulation (PWM) circuit 182, a drive circuit 183, a switching element SW, a diode D, an inductor L, a capacitor C, and an output terminal 184, and converts an input voltage Vin into an output voltage Vout which is in accordance with the first reference voltage Vref1A, and outputs the output voltage Vout from the output terminal 184. It is to be noted that, although not illustrated, an AC-DC converter is provided in a stage ahead of an input terminal to which the input voltage Vin is inputted, and it is assumed that conversion, for example, from 100 V AC to 20 V DC is already carried out.

The comparison circuit 181 includes an output detecting unit 185 and an error amplifier 186, and outputs a voltage that is in accordance with the difference between the output voltage Vout and the first reference voltage Vref1A, to the PWM circuit 182.

The output detecting unit 185, which includes two resistors R1 and R2 provided between the output terminal 184 and a grounding potential, voltage-divides the output voltage Vout in accordance with the resistance ratio between the resistors R1 and R2, and outputs the voltage-divided output voltage Vout to the error amplifier 186.

The error amplifier 186 compares the Vout that has been voltage-divided by the output detection unit 185 and the first reference voltage Vref1A outputted by the voltage margin setting unit 175, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the voltage margin setting unit 175, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1A inputted from the voltage margin setting unit 175. Stated differently, the error amplifier 186 outputs, to the PWM circuit 182, a voltage that is in accordance with the potential difference between the output voltage Vout and the first reference voltage Vref1A.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1A is big, and outputs a pulse waveform having a short ON duty when the potential difference between the output voltage Vout and the first reference voltage Vref1A is small. It is to be noted that the ON period of a pulse waveform is a period in which the pulse waveform is active.

The drive circuit 183 turns ON the switching element SW during the period in which the pulse waveform outputted by the PWM circuit 182 is active, and turns OFF the switching element SW during the period in which the pulse waveform outputted by the PWM circuit 182 is inactive.

The switching element SW is switched between conduction and non-conduction by the drive circuit 183. The input voltage Vin is outputted, as the output voltage Vout, to the output terminal 184 via the inductor L and the capacitor C only while the switching element is the state of conduction. Accordingly, from 0V, the output voltage Vout gradually approaches 20 V (Vin). At this time the inductor L and the capacitor C are charged. Since voltage is applied (charged) to both ends of the inductor L, the output voltage Vout becomes a potential which is lower than the input voltage Vin by such voltage.

As the output voltage Vout approaches the first reference voltage Vref1A, the voltage inputted to the PWM circuit 182 becomes smaller, and the ON duty of the pulse signal outputted by the PWM circuit 182 becomes shorter.

Then, the time in which the switching element SW is ON also becomes shorter, and the output voltage Vout gently converges with the first reference voltage Vref1A.

The potential of the output voltage Vout, while having slight voltage fluctuations, eventually settles to a potential in the vicinity of Vout=Vref1.

In this manner, the variable-voltage source 180 generates the output voltage Vout which becomes the first reference voltage Vref1A outputted by the voltage margin setting unit 175, and supplies the output voltage Vout to the organic EL display unit 110.

Figures 5, 6:
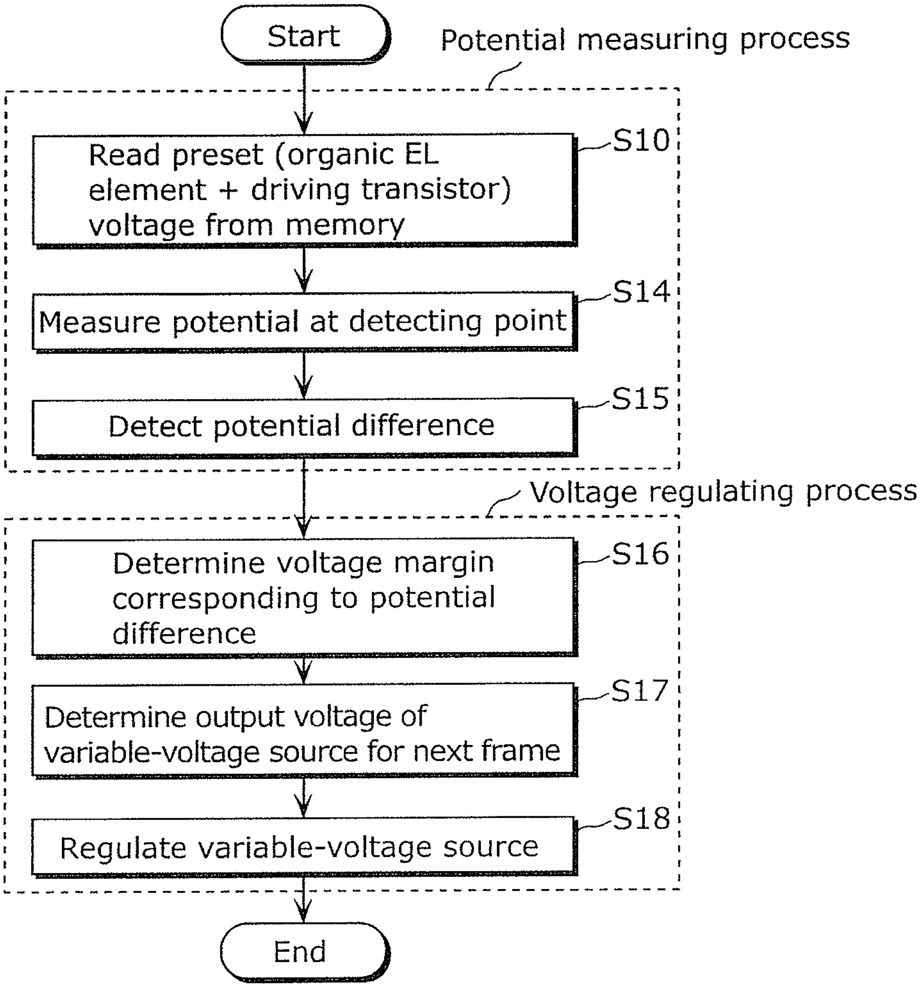
FIG. 5 is a flowchart showing the operation of the display device according to Embodiment 1 of the present disclosure.
FIG. 6 is a chart showing an example of a required voltage conversion table according to Embodiment 1.

Next, the operation of the aforementioned display device 50 shall be described using FIG. 5 to FIG. 7.

FIG. 5 is a flowchart showing the operation of the display device 50 according to the present disclosure.

First, the voltage margin setting unit 175 reads, from a memory, the preset voltage (VEL+VTFT) corresponding to the peak gradation level (step S10). Specifically, the voltage margin setting unit 175 determines the VTFT+VEL corresponding to the gradation levels for each color, using a required voltage conversion table indicating the required voltage VTFT+VEL corresponding to the peak gradation level for each color.

FIG. 6 is a chart showing an example of a required voltage conversion table which is referenced by the voltage margin setting unit 175. As shown in the figure, required voltages VTFT+VEL respectively corresponding to the peak gradation level (gradation level 255) are stored in the required voltage conversion table. For example, the required voltage at the peak gradation level of R is 11.2 V, the required voltage at the peak gradation level of G is 12.2 V, and the required voltage at the peak gradation level of B is 8.4 V. Among the required voltages at the peak gradation levels of the respective colors, the largest voltage is the 12.2 V of G. Therefore, the voltage margin setting unit 175 determines VTFT+VEL to be 12.2 V.

Meanwhile, the potential difference detecting circuit 170 detects the respective potentials at the detecting points $M_A$ and $M_B$ via the monitor wires 190A and 190B, and calculates the inter-pixel potential difference which is the difference between the potentials at the detecting points $M_A$ and $M_B$ (step S14)

Next, the potential difference detecting circuit 170 detects the potential difference ΔV between the output voltage of the output terminal 184 of the variable-voltage source 180 and the inter-pixel potential difference (step S15). Subsequently, the potential difference detecting circuit 170 outputs the detected potential difference ΔV to the voltage margin setting unit 175. It is to be noted that the steps S10 to S15 up to this point correspond to the potential measuring process according to the present disclosure.

Next, the voltage margin setting unit 175 determines a voltage drop margin Vdrop corresponding to the potential difference ΔV detected by the potential difference detecting circuit 170, based on a potential difference signal outputted by the potential difference detecting circuit 170 (step S16). Specifically, the voltage margin setting unit 175 has a voltage margin conversion table indicating the voltage drop margin Vdrop corresponding to the potential difference ΔV, and determines the voltage drop margin Vdrop with reference to the conversion table.

FIG. 7 is a chart showing an example of the voltage margin conversion table that is referenced by the voltage margin setting unit 175.

As shown in the figure, voltage drop margins Vdrop respectively corresponding to the potential differences ΔV are stored in the voltage margin conversion table. For example, when the potential difference ΔV is 3.4 V, the voltage drop margin Vdrop is 3.4 V. Therefore, the voltage margin setting unit 175 determines the voltage drop margin Vdrop to be 3.4 V.

Now, as shown in the voltage margin conversion table, the potential difference ΔV and the voltage drop margin Vdrop have an increasing function relationship. Furthermore, the output voltage Vout of the variable-voltage source 180 rises with a bigger voltage drop margin Vdrop. In other words, the potential difference ΔV and the output voltage Vout have an increasing function relationship.

Next, the voltage margin setting unit 175 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the voltage margin setting unit 175 regulates the variable-voltage source 180 by setting the first reference voltage Vref1A as VTFT+VEL+Vdrop at the beginning of the next frame period (step S18). With this, in the next frame period, the variable-voltage source 180 supplies Vout=VTFT+VEL+Vdrop to the organic EL display unit 110.

It is to be noted that step S16 to step S18 correspond to the voltage regulating process according to the present disclosure.

In this manner, the display device 50 according to this embodiment includes: the variable-voltage source 180 which outputs at least one of the high-side potential and the low-side potential; the potential difference detecting circuit 170 which detects the inter-pixel potential difference from the potentials applied to the two different monitor pixels 111$M_A$ and 111$M_B$ and measures the output voltage Vout of the variable-voltage source 180; and the voltage margin setting unit 175 which regulates the variable-voltage source 180 so that the inter-pixel potential difference is set to the predetermined potential (VTFT+VEL). Furthermore, the potential difference detecting circuit 170, in addition, detects the potential difference between the measured high-side potential output voltage Vout and the inter-pixel potential difference, and the voltage margin setting unit 175 regulates the variable-voltage source 180 in accordance with the potential difference detected by the potential difference detecting circuit 170.

With this, the display device 50 can reduce excess voltage and reduce power consumption by detecting (i) the voltage drop caused by the horizontal first power source wire resistance R1*h* and the vertical first power source wire resistance R1*v* and (ii) the voltage rise due to the horizontal second power source wire resistance R2*h* and the vertical second power source wire resistance R2*v*, and giving feedback to the variable-voltage source 180 regarding the degree of such voltage drop and voltage rise.

In addition, compared to when the high-side potential and the low-side potential applied to the pixels are detected from the same monitor pixel, the display device 50 according to this embodiment is able to reduce power consumption more effectively when the wire resistance distribution of the high-side potential power source wire and the wire resistance distribution of the low-side potential power source wire are different.

Furthermore, since heat generation by the organic EL element 121 is suppressed through the reduction of power consumption, the deterioration of the organic EL element 121 can be prevented.

Next, the display pattern transition in the case where the video data inputted up to the Nth frame changes from the N+1th frame onward, in the display device 50 described above, shall be described using FIG. 8 and FIG. 9.

Initially, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 50 in the case where video data as described above is inputted in the Nth frame and the N+1th frame shall be described.

Figure 8:
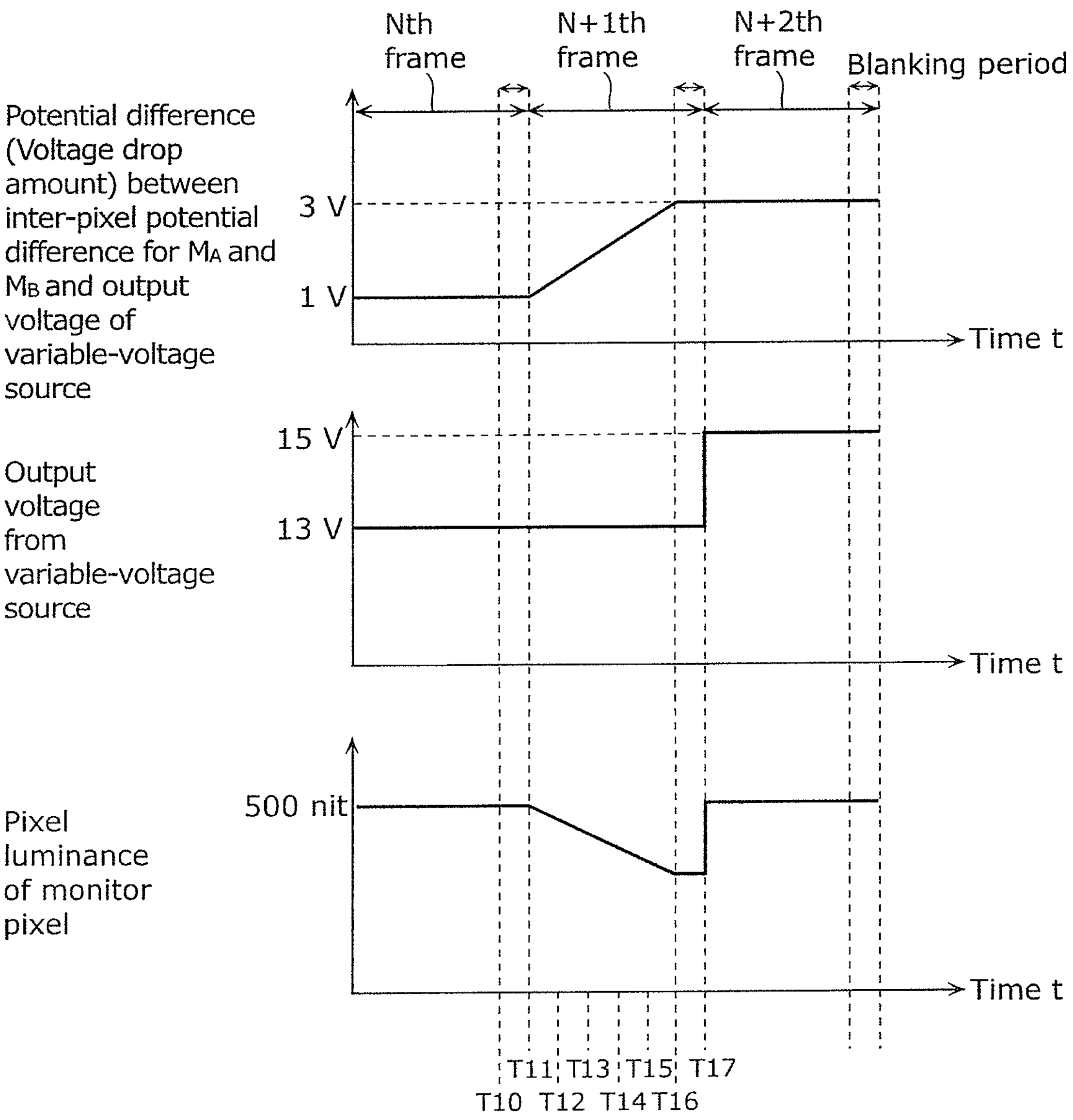
FIG. 8 is a timing chart showing the operation of the display device from an Nth frame to an N+2th frame.

FIG. 8 is a timing chart showing the operation of the display device 50 from the Nth frame to the N+2th frame.

The potential difference ΔV detected by the potential difference detecting circuit 170, the output voltage Vout from the variable-voltage source 180, and the pixel luminance of the monitor pixels 111$M_A$ and 111$M_B$ are shown in the figure. Furthermore, a blanking period is provided at the end of each frame period.

Figure 9:
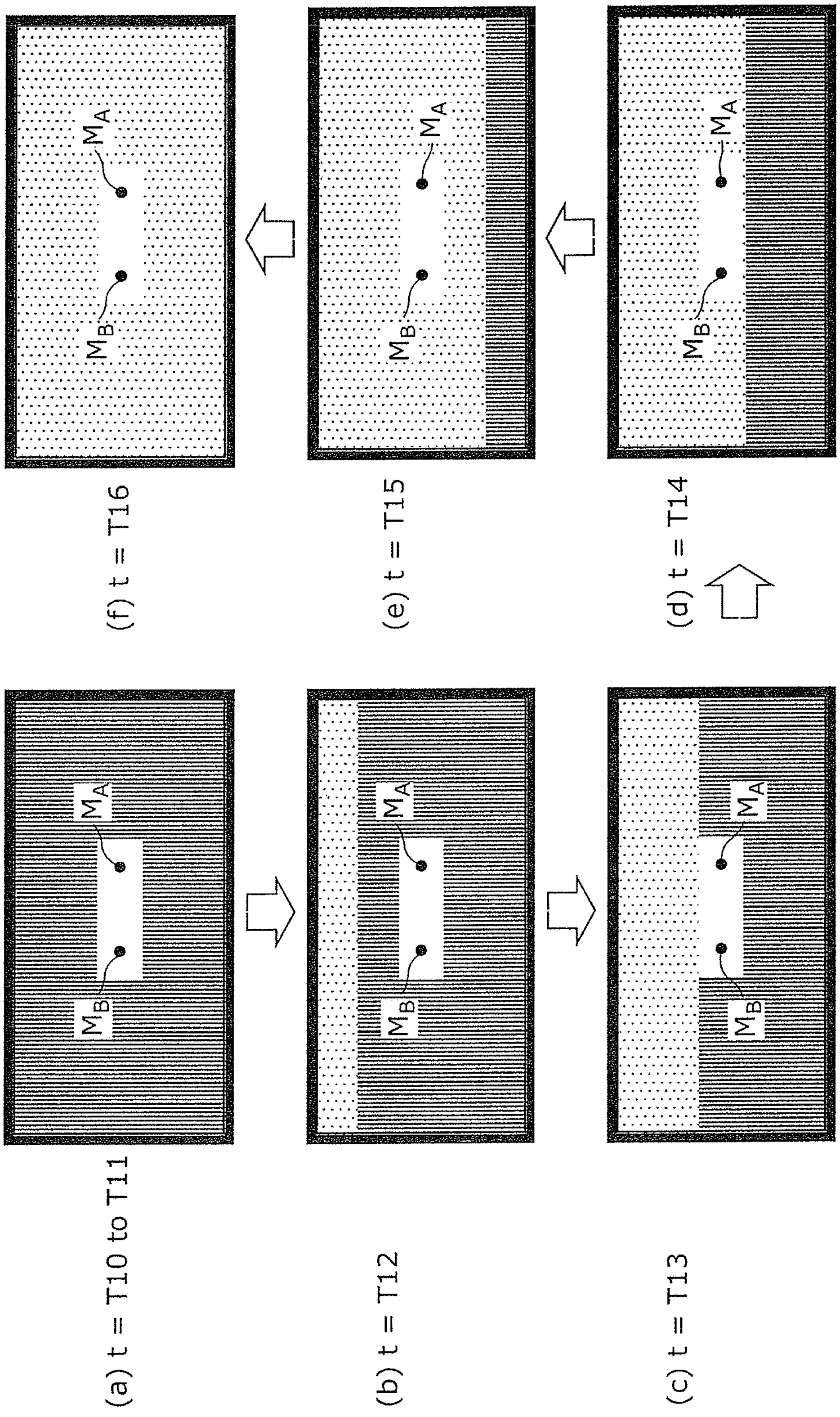
FIG. 9 is diagram schematically showing images displayed on the organic EL display unit.

FIG. 9 is diagram schematically showing images displayed on the organic EL display unit.

In a t=T10, the signal processing circuit 165 receives input of the video data of the Nth frame. The voltage margin setting unit 175 uses the required voltage conversion table and sets the 12.2 V required voltage at the peak gradation level of G to the voltage (VTFT+VEL).

Meanwhile, the potential difference detecting circuit 170 detects the respective potentials at the detecting points $M_A$ and $M_B$ via the monitor wires 190A and 190B, and detects the potential difference ΔV between the inter-pixel potential difference, which is the difference between the aforementioned potentials, and the output voltage Vout outputted from the variable-voltage source 180. For example, in time t=T10, the potential difference detecting circuit 170 detects ΔV=1 V. Subsequently, the voltage margin setting unit 175 uses the voltage margin conversion table and determines the voltage drop margin Vdrop for the N+1th frame to be 1 V.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in time t=T10 to T11. In this period, the image displayed on the organic EL display unit 110 corresponds to the image data of the Nth frame, and thus the central part is white and the part other than the central part is gray.

In time t=T11, the voltage margin setting unit 175 sets the voltage of the first reference voltage Vref1A as the sum VTFT+VEL+Vdrop (for example, 13.2 V) of the aforementioned voltage (VTFT+VEL) and the voltage drop margin Vdrop.

Over a time t=T11 to T16, the image corresponding to the video data of the N+1th frame is gradually displayed on the organic EL display unit 110 ((b) to (f) in FIG. 9). At this time, the output voltage Vout from the variable-voltage source 180 is, at all times, the VTFT+VEL+Vdrop that is set to the voltage of the first reference voltage Vref1A in the time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 and the voltage rise in the second power source wire 113 gradually increase following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the luminescence luminance of the pixels 111 at the central part of the organic EL display unit 110 gradually drops.

In a time t=T16, the signal processing circuit 165 receives input of the video data of the N+1th frame. The voltage margin setting unit 175 uses the required voltage conversion table and continues to set the 12.2 V required voltage at the peak gradation level of G to the voltage (VTFT+VEL).

Meanwhile, the potential difference detecting circuit 170 detects the potential at the detecting point $M_A$ via the monitor wire 190A, detects the potential at the detecting point $M_B$ via the monitor wire 190B, and detects the potential difference ΔV between the inter-pixel potential difference between both detecting points and the output voltage Vout outputted by the variable-voltage source 180. For example, in time t=T16, the potential difference detecting circuit 170 detects ΔV=3 V. Subsequently, the voltage margin setting unit 175 uses the voltage margin conversion table and determines the voltage drop margin Vdrop for the N+1th frame to be 3 V.

Next, in time t=T17, the voltage margin setting unit 175 sets the voltage of the first reference voltage Vref1A to the sum VTFT+VEL+Vdrop (for example, 15.2 V) of the aforementioned voltage (VTFT+VEL) and the voltage drop margin Vdrop. Therefore, from the time t=17 onward, the potential difference between the detecting point $M_A$ and the detecting point $M_B$ reaches VTFT+VEL which is the predetermined potential.

In this manner, in the display device 50, although luminance temporarily drops in the N+1th frame, this is a very short period and thus has practically no impact on the user.

Embodiment 2

Compared to the display device according to Embodiment 1, a display device according to this embodiment is different in that the reference voltage that is inputted to a variable-voltage source not only changes depending on a change in the potential difference ΔV detected by a potential difference detecting circuit, but also changes depending on a peak signal detected, for each frame, from the inputted video data. Hereinafter, description shall not be repeated for points which are the same as in Embodiment 1 and shall be centered on the points of difference from Embodiment 1. Furthermore, the figures applied to Embodiment 1 shall be used for figures that would otherwise overlap with those in Embodiment 1.

Hereinafter, Embodiment 2 of the present disclosure shall be specifically described with reference to the Drawings.

Figure 10:
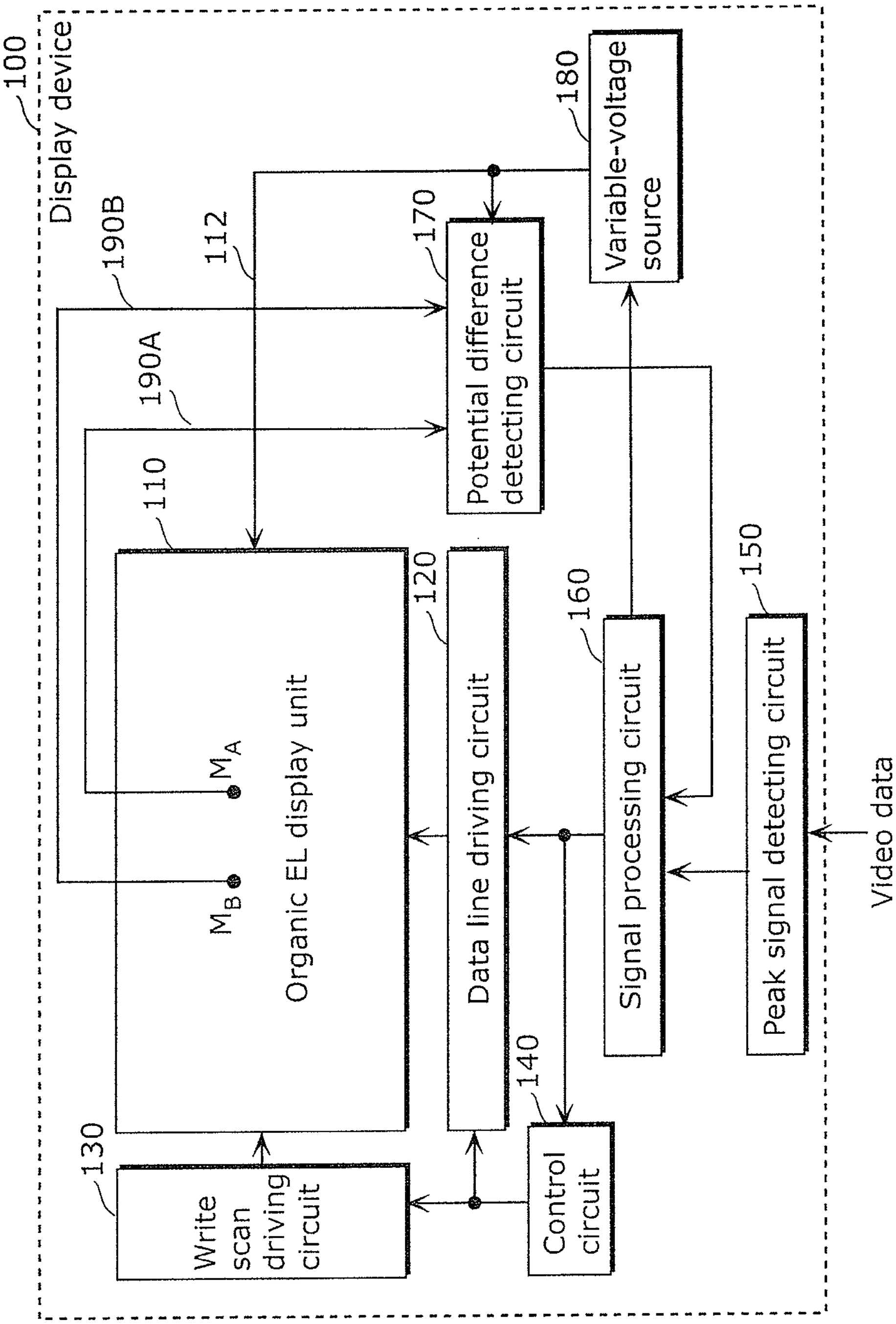
FIG. 10 is a block diagram showing an outline configuration of a display device according to Embodiment 2 of the present disclosure.

FIG. 10 is a block diagram showing an outline configuration of the display device according to Embodiment 2 of the present disclosure.

A display device 100 shown in the figure includes the organic EL display unit 110, the data line driving circuit 120, the write scan driving circuit 130, the control circuit 140, a peak signal detecting circuit 150, a signal processing circuit 160, the potential difference detecting circuit 170, the variable-voltage source 180, and the monitor wires 190A and 190B.

The configuration of the organic EL display unit 110 is the same as that shown in FIG. 2, FIG. 3A, and FIG. 3B in Embodiment 1.

As shown in the figure, the organic EL display unit 110 includes the pixels 111, the first power source wire 112, and the second power source wire 113.

The peak signal detecting circuit 150 detects the peak value of the video data inputted to the display device 100, and outputs a peak signal representing the detected peak value to the signal processing circuit 160. Specifically, the peak signal detecting circuit 150 detects, as the peak value, data of the highest gradation level out of the video data. High gradation level data corresponds to an image that is to be displayed brightly by the organic EL display unit 110.

The signal processing circuit 160, which in this embodiment is the voltage regulating unit, regulates the variable-voltage source 180 so that the inter-pixel potential difference, which is the potential difference between the high-side potential of the monitor pixel 111$M_A$ and the low-side potential of the monitor pixel 111$M_B$, is set to a predetermined potential, based on the peak signal outputted by the peak signal detecting circuit 150 and the potential difference ΔV detected by the potential difference detecting circuit 170. Specifically, the signal processing circuit 160 determines the voltage required by the organic EL element 121 and the driving transistor 125 when causing the pixels 111 to produce luminescence according to the peak signal outputted by the peak signal detecting circuit 150. Furthermore, the signal processing circuit 160 calculates a voltage margin based on the potential difference detected by the potential difference detecting circuit 170. Subsequently, the signal processing circuit 160 sums up a voltage VEL required by the organic EL element 121, a voltage VTFT required by the driving transistor 125, and the voltage drop margin Vdrop, and outputs the summation result VEL+VTFT+Vdrop, as the potential of a first reference voltage Vref1, to the variable-voltage source 180.

Furthermore, the signal processing circuit 160 outputs, to the data line driving circuit 120, a signal voltage corresponding to the video data inputted via the peak signal detecting circuit 150.

The potential difference detecting circuit 170, which in this embodiment is the voltage detecting unit, measures the high-side potential applied to the monitor pixel 111$M_A$ and the low-side potential applied to the monitor pixel 111$M_B$. Specifically, the potential difference detecting circuit 170 measures, via the monitor wire 190A, the high-side potential applied to the monitor pixel 111$M_A$, and measures, via the monitor wire 190B, the low-side potential applied to the monitor pixel 111$M_B$. Subsequently, the potential difference detecting circuit 170 calculates the inter-pixel potential difference which is the potential difference between the high-side potential of the monitor pixel 111$M_A$ and the low-side potential of the monitor pixel 111$M_B$ that were measured. In addition, the potential difference detecting circuit 170 measures the output voltage of the variable-voltage source 180, and measures the potential difference ΔV between such output voltage and the calculated inter-pixel potential difference. Subsequently, the potential difference detecting circuit 170 outputs the measured potential difference ΔV to the signal processing circuit 160.

The variable-voltage source 180, which in this embodiment is the power supplying unit, outputs at least one of the high-side potential and the low-side potential to the organic EL display unit 110. The variable-voltage source 180 outputs an output voltage Vout for setting the inter-pixel potential difference detected from the monitor pixels 111$M_A$ and 111$M_B$ to the predetermined potential (VEL+VTFT), according to the first reference voltage Vref1 outputted by the signal processing circuit 160.

The monitor wire 190A is a high-side potential detecting wire which has one end connected to the monitor pixel 111$M_A$ and the other end connected to the potential difference detecting circuit 170, and transmits the high-side potential applied to the monitor pixel 111$M_A$ to the potential difference detecting circuit 170.

The monitor wire 190B is a low-side potential detecting wire which has one end connected to the monitor pixel 111$M_B$ and the other end connected to the potential difference detecting circuit 170, and transmits the low-side potential applied to the monitor pixel 111$M_B$ to the potential difference detecting circuit 170.

Next, a detailed configuration of the variable-voltage source 180 shall be briefly described.

Figure 11:
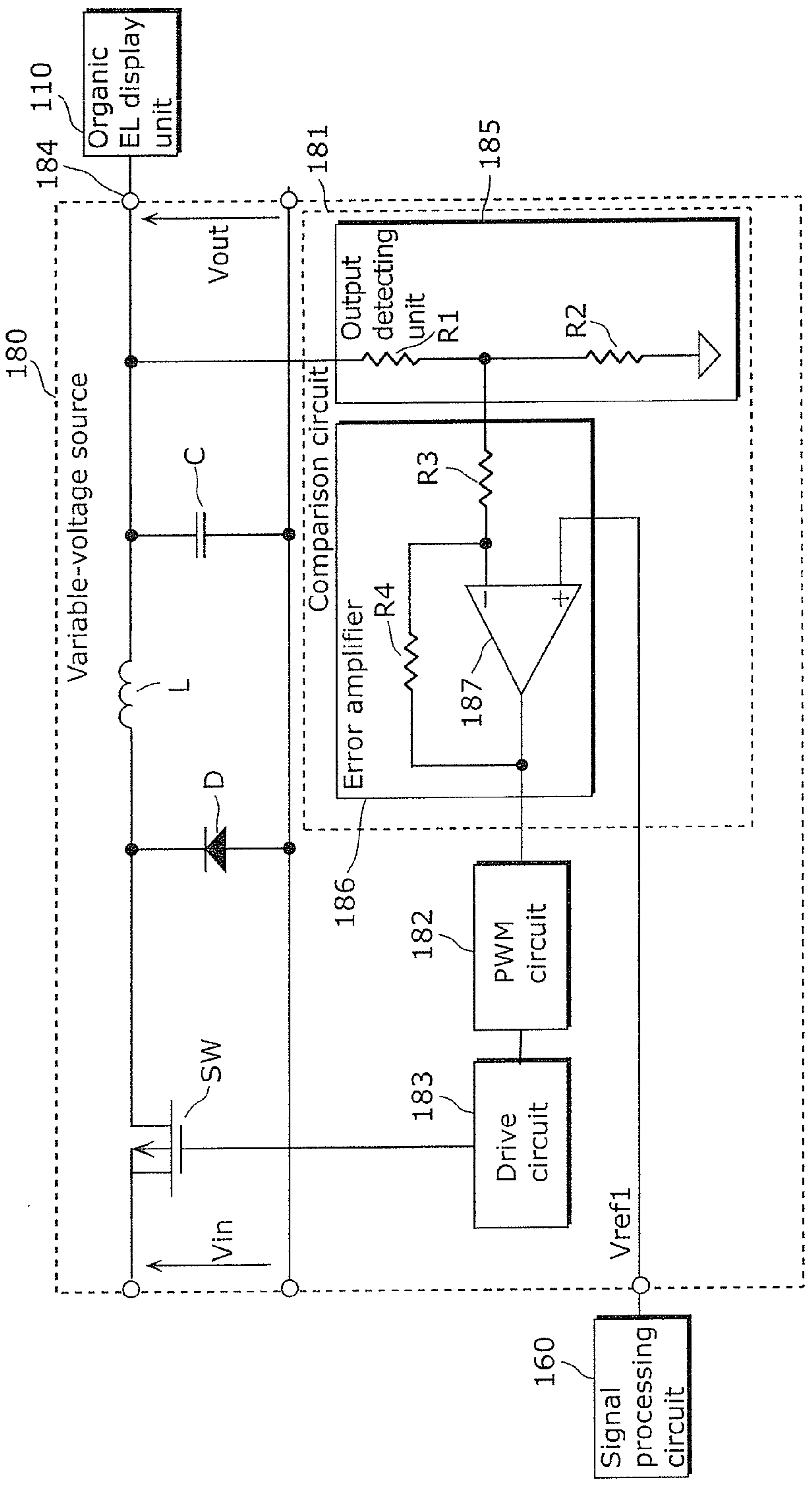
FIG. 11 is a block diagram showing an example of a specific configuration of a variable-voltage source according to Embodiment 2.

FIG. 11 is a block diagram showing an example of a specific configuration of a variable-voltage source according to Embodiment 2. It is to be noted that the organic EL display unit 110 and the signal processing circuit 160 which are connected to the variable-voltage source are also shown in the figure.

The variable-voltage source 180 shown in the figure is the same as the high-side potential variable-voltage source 180 described in Embodiment 1.

The error amplifier 186 compares the Vout that has been voltage-divided by the output detection unit 185 and the first reference voltage Vref1 outputted by the signal processing circuit 160, and outputs, to the PWM circuit 182, a voltage that is in accordance with the comparison result. Specifically, the error amplifier 186 includes an operational amplifier 187 and resistors R3 and R4. The operational amplifier 187 has an inverting input terminal connected to the output detecting unit 185 via the resistor R3, a non-inverting input terminal connected to the signal processing circuit 160, and an output terminal connected to the PWM circuit 182. Furthermore, the output terminal of the operational amplifier 187 is connected to the inverting input terminal via the resistor R4. With this, the error amplifier 186 outputs, to the PWM circuit 182, a voltage that is in accordance with the potential difference between the voltage inputted from the output detecting unit 185 and the first reference voltage Vref1 inputted from the signal processing circuit 160. Stated differently, the error amplifier 186 outputs, to the PWM circuit 182, a voltage that is in accordance with the potential difference between the output voltage Vout and the first reference voltage Vref1.

The PWM circuit 182 outputs, to the drive circuit 183, pulse waveforms having different duties depending on the voltage outputted by the comparison circuit 181. Specifically, the PWM circuit 182 outputs a pulse waveform having a long ON duty when the voltage outputted by the comparison circuit 181 is large, and outputs a pulse waveform having a short ON duty when the outputted voltage is small. Stated differently, the PWM circuit 182 outputs a pulse waveform having a long ON duty when the potential difference between the output voltage Vout and the first reference voltage Vref1 is big, and outputs a pulse waveform having a short ON duty when the potential difference between the output voltage Vout and the first reference voltage Vref1 is small. It is to be noted that the ON period of a pulse waveform is a period in which the pulse waveform is active.

As the output voltage Vout approaches the first reference voltage Vref1, the voltage inputted to the PWM circuit 182 decreases, and the ON duty of the pulse signal outputted by the PWM circuit 182 becomes shorter.

Then, the time in which the switching element SW is ON becomes shorter, and the output voltage Vout gently converges with the first reference voltage Vref1.

The potential of the output voltage Vout, while having slight voltage fluctuations, eventually settles to a potential in the vicinity of Vout=Vref1.

In this manner, the variable-voltage source 180 generates the output voltage Vout which approximates the first reference voltage Vref1 outputted by the signal processing circuit 160, and supplies the output voltage Vout to the organic EL display unit 110.

Figure 12:
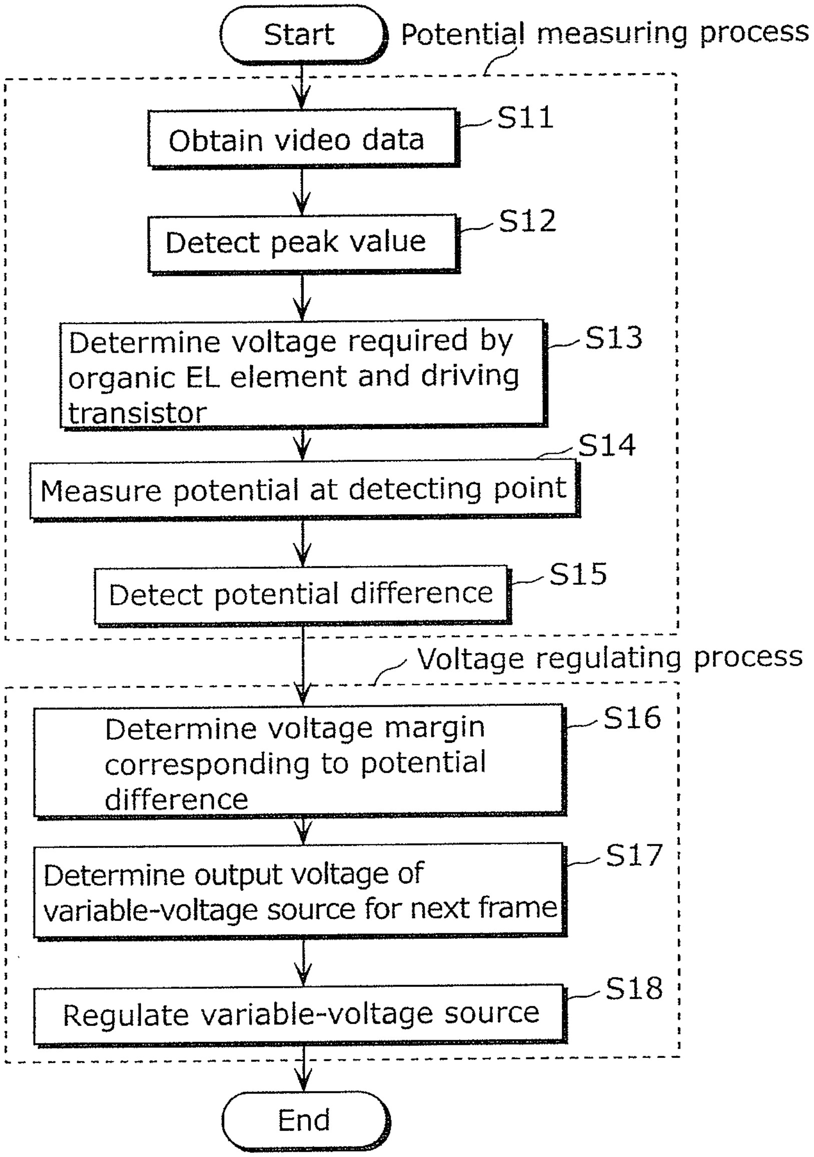
FIG. 12 is a flowchart showing the operation of the display device according to Embodiment 2 of the present disclosure.

Next, the operation of the aforementioned display device 100 shall be described using FIG. 12, FIG. 13, and FIG. 7.

FIG. 12 is a flowchart showing the operation of the display device 100 according to the present disclosure.

First, the peak signal detecting circuit 150 obtains the video data for one frame period inputted to the display device 100 (step S11). For example, the peak signal detecting circuit 150 includes a buffer and stores the video data for one frame period in such buffer.

Next, the peak signal detecting circuit 150 detects the peak value of the obtained video data (step S12), and outputs a peak signal representing the detected peak value to the signal processing circuit 160. Specifically, the peak signal detecting circuit 150 detects the peak value of the video data for each color. For example, for each of red (R), green (G), and blue (B), the video data is expressed using the 256 gradation levels from 0 to 255 (luminance being higher with a larger value). Here, when part of the video data of the organic EL display unit 110 has R:G:B=177:124:135, another part of the video data of the organic EL display unit 110 has R:G:B=24:177:50, and yet another part of the video data of the organic EL display unit 110 has R:G:B=10:70:176, the peak signal detecting circuit 150 detects 177 as the peak value of R, 177 for the peak value of G, and 176 as the peak value of B, and outputs, to the signal processing circuit 160, a peak signal representing the detected peak value of each color.

Next, the signal processing circuit 160 determines the voltage VTFT required by the driving transistor 125 and the voltage VEL required by the organic EL element 121 when causing the organic EL element 121 to produce luminescence according to the peak values outputted by the peak signal detecting circuit 150 (step S13). Specifically, the signal processing circuit 160 determines the VTFT+VEL corresponding to the gradation levels for each color, using a required voltage conversion table indicating the required voltage VTFT+VEL corresponding to the gradation levels for each color.

FIG. 13 is a chart showing an example of the required voltage conversion table provided in the signal processing circuit 160.

As shown in the figure, required voltages VTFT+VEL respectively corresponding to the gradation levels of each color are stored in the required voltage conversion table. For example, the required voltage corresponding to the peak value 177 of R is 8.5 V, the required voltage corresponding to the peak value 177 of G is 9.9 V, and the required voltage corresponding to the peak value 176 of B is 6.7 V. Among the required voltages corresponding to the peak values of the respective colors, the largest voltage is 9.9 V corresponding to the peak value of G. Therefore, the signal processing circuit 160 determines VTFT+VEL to be 9.9 V.

Meanwhile, the potential difference detecting circuit 170 detects the respective potentials at the detecting points $M_A$ and $M_B$ via the monitor wires 190A and 190B, and calculates the inter-pixel potential difference which is the difference between the potentials at the detecting points $M_A$ and $M_B$ (step S14).

Next, the potential difference detecting circuit 170 detects the potential difference ΔV between the output voltage of the output terminal 184 of the variable-voltage source 180 and the inter-pixel potential difference (step S15). Subsequently, the potential difference detecting circuit 170 outputs the detected potential difference ΔV to the signal processing circuit 160. It is to be noted that the steps S11 to S15 up to this point correspond to the potential measuring process according to the present disclosure.

Next, the signal processing circuit 160 determines a voltage drop margin Vdrop corresponding to the potential difference ΔV detected by the potential difference detecting circuit 170, based on a potential difference signal outputted by the potential difference detecting circuit 170 (step S16). Specifically, the signal processing circuit 160 has a voltage margin conversion table indicating the voltage drop margin Vdrop corresponding to the potential difference ΔV, and determines the voltage drop margin Vdrop with reference to the conversion table.

As shown in FIG. 7, voltage drop margins Vdrop respectively corresponding to the potential differences ΔV are stored in the voltage margin conversion table. For example, when the potential difference ΔV is 3.4 V, the voltage drop margin Vdrop is 3.4 V. Therefore, the signal processing circuit 160 determines the voltage drop margin Vdrop to be 3.4 V.

Now, as shown in the voltage margin conversion table, the potential difference ΔV and the voltage drop margin Vdrop have an increasing function relationship. Furthermore, the output voltage Vout of the variable-voltage source 180 rises with a bigger voltage drop margin Vdrop. In other words, the potential difference ΔV and the output voltage Vout have an increasing function relationship.

Next, the signal processing circuit 160 determines the output voltage Vout that the variable-voltage source 180 is to be made to output in the next frame period (step S17). Specifically, the output voltage Vout that the variable-voltage source 180 is to be made to output in the next frame period is assumed to be VTFT+VEL+Vdrop which is the sum value of (i) VTFT+VEL determined in the determination (step S13) of the voltage required by the organic EL element 121 and the driving transistor 125 and (ii) the voltage drop margin Vdrop determined in the determination (step S15) of the voltage margin corresponding to the potential difference ΔV.

Lastly, the signal processing circuit 160 regulates the variable-voltage source 180 by setting the first reference voltage Vref1 as VTFT+VEL+Vdrop at the beginning of the next frame period (step S18). With this, in the next frame period, the variable-voltage source 180 supplies Vout=VTFT+VEL+Vdrop to the organic EL display unit 110. It is to be noted that step S16 to step S18 correspond to the voltage regulating process according to the present disclosure.

In this manner, the display device 100 according to this embodiment includes: the variable-voltage source 180 which outputs at least one of the high-side potential and the low-side potential; the potential difference detecting circuit 170 which detects the inter-pixel potential difference from the potentials applied to the two different monitor pixels 111$M_A$ and 111$M_B$ and measures the output voltage Vout of the variable-voltage source 180; and the signal processing circuit 160 which regulates the variable-voltage source 180 so that the inter-pixel potential difference is set to the predetermined potential (VTFT+VEL). Furthermore, the potential difference detecting circuit 170, in addition, detects the potential difference between the measured high-side potential output voltage Vout and the inter-pixel potential difference, and the signal processing circuit 160 regulates the variable-voltage source 180 in accordance with the potential difference detected by the potential difference detecting circuit 170.

With this, the display device 100 can reduce excess voltage and reduce power consumption by detecting (i) the voltage drop caused by the horizontal first power source wire resistance R1*h* and the vertical first power source wire resistance R1*v* and (ii) the voltage rise due to the horizontal second power source wire resistance R2*h* and the vertical second power source wire resistance R2*v*, and giving feedback to the variable-voltage source 180 regarding the degree of such voltage drop and voltage rise.

In addition, compared to when the high-side potential and the low-side potential applied to the pixels are detected from the same monitor pixel, the display device 100 according to this embodiment is able to reduce power consumption more effectively when the wire resistance distribution of the high-side potential power source wire and the wire resistance distribution of the low-side potential power source wire are different.

Furthermore, since heat generation by the organic EL element 121 is suppressed through the reduction of power consumption, the deterioration of the organic EL element 121 can be prevented.

Next, the display pattern transition in the case where the video data inputted up to the Nth frame changes from the N+1th frame onward, in the display device 100 described above, shall be described using FIG. 8 and FIG. 9.

Initially, the video data that is assumed to have been inputted in the Nth frame and the N+1th frame shall be described.

First, it is assumed that, up to the Nth frame, the video data corresponding to the central part of the organic EL display unit 110 is a peak gradation level (R:G:B=255:255:255) in which the central part of the organic EL display unit 110 is seen as being white. On the other hand, it is assumed that the video data corresponding to a part of the organic EL display unit 110 other than the central part is a gray gradation level (R:G:B=50:50:50) in which the part of the organic EL display unit 110 other than the central part is seen as being gray.

Furthermore, from the N+1th frame onward, it is assumed that the video data corresponding to the central part of the organic EL display unit 110 is the peak gradation level (R:G:B=255:255:255) as in the Nth frame. On the other hand, it is assumed that the video data corresponding to the part of the organic EL display unit 110 other than the central part is a gray gradation level (R:G:B=150:150:150) that can be seen as a brighter gray than in the Nth frame.

Next, the operation of the display device 100 in the case where video data as described above is inputted in the Nth frame and the N+1th frame shall be described.

FIG. 8 shows the potential difference ΔV detected by the potential difference detecting circuit 170, the output voltage Vout from the variable-voltage source 180, and the pixel luminance of the monitor pixels 111$M_A$ and 111$M_B$. Furthermore, a blanking period is provided at the end of each frame period.

In time t=T10, the peak signal detecting circuit 150 detects the peak value of the video data of the Nth frame. The signal processing circuit 160 determines VTFT+VEL from the peak value detected by the peak signal detecting circuit 150. Here, since the peak value of the video data of the Nth frame is R:G:B=255:255:255, the signal processing circuit 160 uses the required voltage conversion table and determines the required voltage VTFT+VEL for the N+1th frame to be, for example, 12.2V.

Meanwhile, the potential difference detecting circuit 170 detects the respective potentials at the detecting points $M_A$ and $M_B$ via the monitor wires 190A and 190B, and detects the potential difference ΔV between the inter-pixel potential difference, which is the difference between the aforementioned potentials, and the output voltage Vout outputted from the variable-voltage source 180. For example, in time t=T10, the potential difference detecting circuit 170 detects ΔV=1 V. Subsequently, the signal processing circuit 160 uses the voltage margin conversion table and determines the voltage drop margin Vdrop for the N+1th frame to be 1 V.

A time t=T10 to T11 is the blanking period of the Nth frame. In this period, an image which is the same as that in the time t=T10 is displayed in the organic EL display unit 110.

(a) in FIG. 9 schematically shows an image displayed on the organic EL display unit 110 in the time t=T10 to T11. In this period, the image displayed on the organic EL display unit 110 corresponds to the image data of the Nth frame, and thus the central part is white and the part other than the central part is gray.

In time t=T11, the signal processing circuit 160 sets the voltage of the first reference voltage Vref1 as the sum VTFT+VEL+Vdrop (for example, 13.2 V) of the determined required voltage VTFT+VEL and the voltage drop margin Vdrop.

Over a time t=T11 to T16, the image corresponding to the video data of the N+1th frame is gradually displayed on the organic EL display unit 110 ((b) to (f) in FIG. 9). At this time, the output voltage Vout from the variable-voltage source 180 is, at all times, the VTFT+VEL+Vdrop set to the voltage of the first reference voltage Vref1 in time t=T11. However, the video data corresponding to the part of the organic EL display unit 110 other than the central part is a gray gradation level that can be seen as a gray that is brighter than that in the Nth frame. Therefore, the amount of current supplied by the variable-voltage source 180 to the organic EL display unit 110 gradually increases over a time t=T11 to T16, and the voltage drop in the first power source wire 112 and the voltage rise in the second power source wire 113 gradually increase following this increase in the amount of current. With this, there is a shortage of power source voltage for the pixels 111 in the central part of the organic EL display unit 110, which are the pixels 111 in a brightly displayed region. Stated differently, luminance drops below the image corresponding to the video data R:G:B=255:255:255 of the N+1th frame. Specifically, over the time t=T11 to T16, the luminescence luminance of the pixels 111 at the central part of the organic EL display unit 110 gradually drops.

Next, in time t=T16, the peak signal detecting circuit 150 detects the peak value of the video data of the N+1th frame. Here, since the detected peak value of the video data of the N+1th frame is R:G:B=255:255:255, the signal processing circuit 160 determines the required voltage VTFT+VEL for the N+2th frame to be, for example, 12.2 V.

Meanwhile, the potential difference detecting circuit 170 detects the potential at the detecting point $M_A$ via the monitor wire 190A, detects the potential at the detecting point $M_B$ via the monitor wire 190B, and detects the potential difference ΔV between the inter-pixel potential difference between both detecting points and the output voltage Vout outputted by the variable-voltage source 180. For example, in time t=T16, the potential difference detecting circuit 170 detects ΔV=3 V. Subsequently, the signal processing circuit 160 uses the voltage margin conversion table and determines the voltage drop margin Vdrop for the N+1th frame to be 3 V.

Next, in time t=T17, the signal processing circuit 160 sets the voltage of the first reference voltage Vref1 to the sum VTFT+VEL+Vdrop (for example, 15.2 V) of the determined required voltage VTFT+VEL and the voltage drop margin Vdrop. Therefore, from the time t=17 onward, the potential difference between the detecting point $M_A$ and the detecting point $M_B$ reaches VTFT+VEL which is the predetermined potential.

In this manner, in the display device 100, although luminance temporarily drops in the N+1th frame, this is a very short period and thus has practically no impact on the user.

Embodiment 3

A display device according to this embodiment is nearly the same as the display device 100 according to Embodiment 1 but is different in not including the potential difference detecting circuit 170 and including an inter-pixel potential difference calculating circuit that calculates the potential difference between the detecting point $M_A$ and the detecting point $M_B$, and in having the calculated potential difference inputted to the variable-voltage source. Furthermore, the signal processing circuit is different in setting the voltage to be outputted to the variable-voltage source to the required voltage VTFT+VEL. With this, in the display device according to this embodiment, the output voltage Vout of the variable-voltage source can be regulated in real-time in accordance with the voltage drop amount, and thus, compared with Embodiment 1, the temporary drop in pixel luminance can be prevented.

Figure 14:
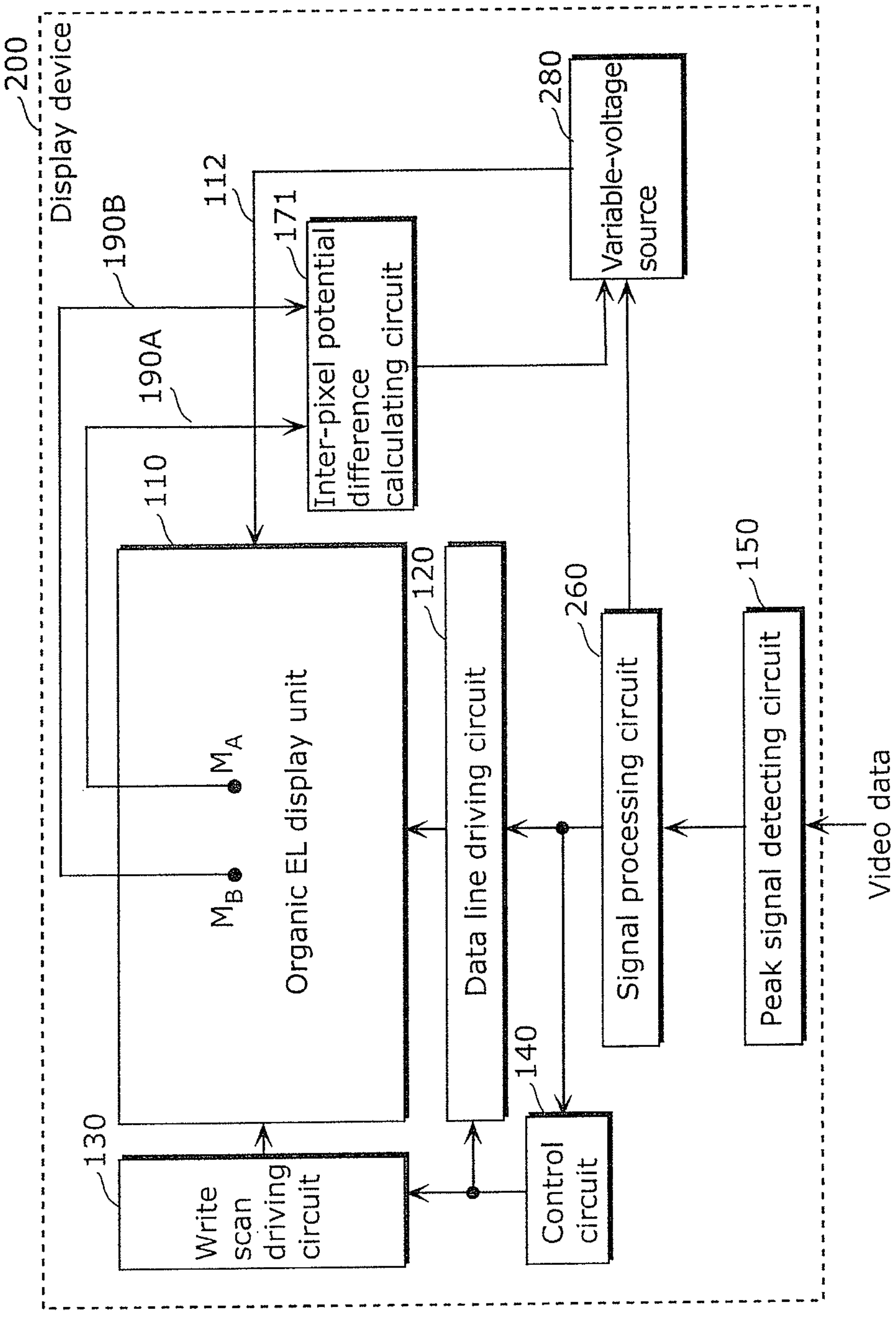
FIG. 14 is a block diagram showing an outline configuration of a display device according to Embodiment 3 of the present disclosure.

FIG. 14 is a block diagram showing an outline configuration of the display device according to Embodiment 3 of the present disclosure.

A display device 200 according to this embodiment shown in the figure is different compared to the display device 100 according to Embodiment 1 shown in FIG. 10 in not including the potential difference detecting circuit 170, and in including an inter-pixel potential difference calculating circuit 171 that calculates the potential difference between the detecting point $M_A$ and the detecting point $M_B$, a signal processing circuit 260 in place of the signal processing circuit 160, and a variable-voltage source 280 in place of the variable-voltage source 180.

The signal processing circuit 260 determines a second reference voltage Vref2 to be outputted to the variable-voltage source 280, from the peak signal outputted by the peak signal detecting circuit 150. Specifically, the signal processing circuit 260 uses the required voltage conversion table and determines the sum VTFT+VEL of the voltage VEL required by the organic EL element 121 and the voltage VTFT required by the driving transistor 125. Subsequently, the signal processing circuit 260 sets the determined VTFT+VEL as the voltage of the second reference voltage Vref2.

In such manner, the second reference voltage Vref2 that is outputted to the variable-voltage source 280 by the signal processing circuit 260 of the display device 200 according to this embodiment is different from the first reference voltage Vref1 that is outputted to the variable-voltage source 180 by the signal processing circuit 160 of the display device 100 according to Embodiment 1, and is a voltage determined in accordance with the video data only. Specifically, the second reference voltage Vref2 is not dependent on the potential difference ΔV between the potential of the output voltage Vout of the variable-voltage source 280 and the inter-pixel potential difference. The inter-pixel potential difference calculating circuit 171 measures, via the monitor wire 190A, the high-side potential applied to the monitor pixel 111$M_A$, and measures, via the monitor wire 190B, the low-side potential applied to the monitor pixel 111$M_B$. Subsequently, the inter-pixel potential difference calculating circuit 171 calculates the inter-pixel potential difference which is the potential difference between the potential of the monitor pixel 111$M_A$ and the potential of the monitor pixel 111$M_B$ that were measured.

The variable-voltage source 280 receives the input of the inter-pixel potential difference from the inter-pixel potential difference calculating circuit 171. Subsequently, the variable-voltage source 280 regulates the output voltage Vout in accordance with the inputted inter-pixel potential difference and the second reference voltage Vref2 outputted by the signal processing circuit 260.

The monitor wire 190A has one end connected to the detecting point $M_A$ and the other end connected to the inter-pixel potential difference calculating circuit 171, and transmits the potential at the detecting point $M_A$ to the inter-pixel potential difference calculating circuit 171.

The monitor wire 190B has one end connected to the detecting point $M_B$ and the other end connected to the inter-pixel potential difference calculating circuit 171, and transmits the potential at the detecting point $M_B$ to the inter-pixel potential difference calculating circuit 171.

Figure 15:
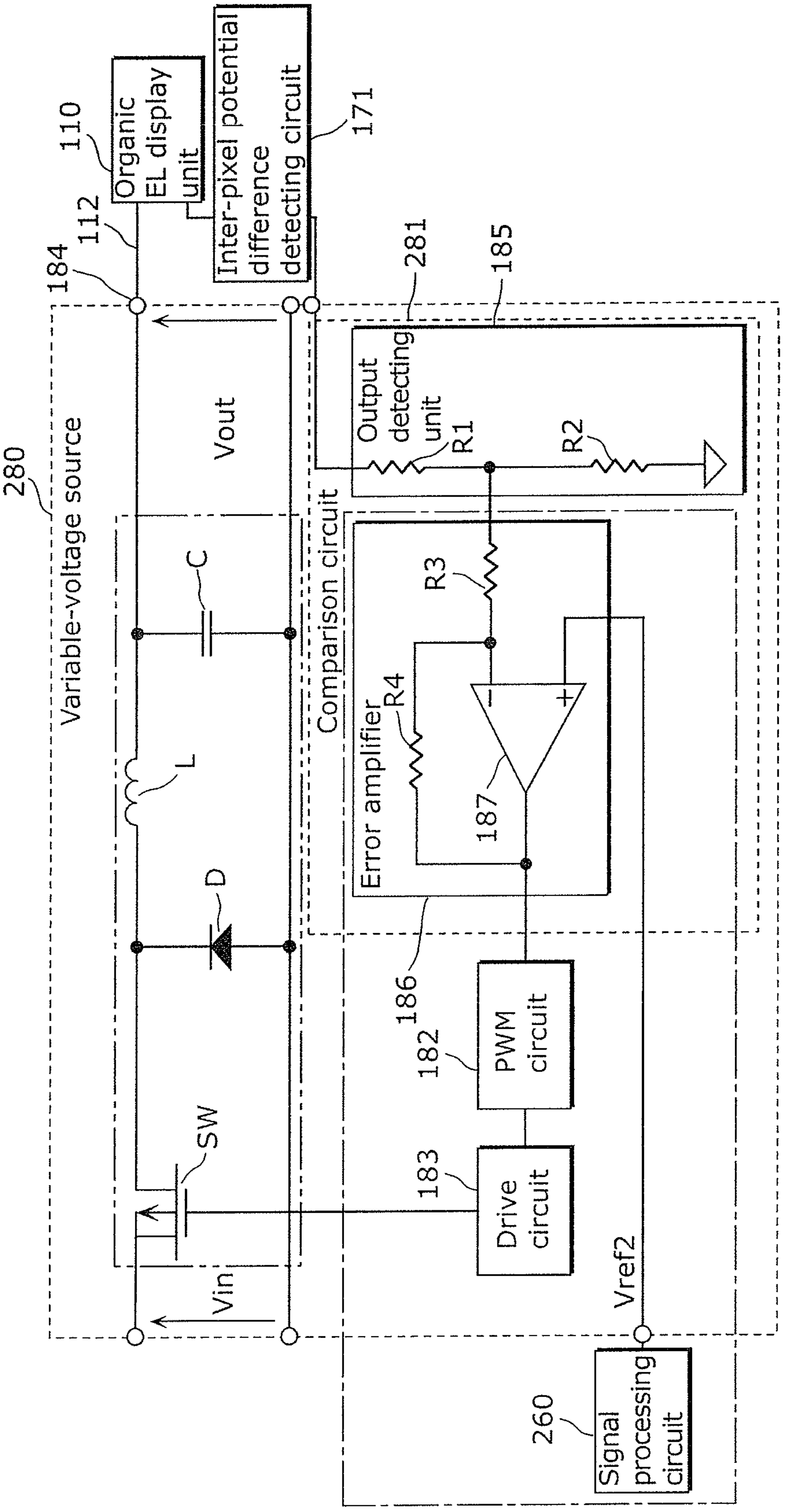
FIG. 15 is a block diagram showing an example of a specific configuration of a variable-voltage source according to Embodiment 3.

FIG. 15 is a block diagram showing an example of a specific configuration of the variable-voltage source 280 in Embodiment 3. It is to be noted that the organic EL display unit 110 and the signal processing circuit 260 which are connected to the variable-voltage source are also shown in the figure.

The variable-voltage source 280 shown in the figure has nearly the same configuration as the variable-voltage source 180 shown in FIG. 11 but is different in including, in place of the comparison circuit 181, a comparison circuit 281 which compares the inter-pixel potential difference outputted by the inter-pixel potential difference calculating circuit 171 and the second reference voltage Vref2.

Here, assuming that the output voltage of the variable-voltage source 280 is Vout, and the voltage drop amount from the output terminal 184 of the variable-voltage source 280 to the detecting points $M_A$ and $M_B$ is ΔV, the inter-pixel potential difference between the detecting points $M_A$ and $M_B$ becomes Vout−ΔV. Specifically, in this embodiment, the comparison circuit 281 compares Vref2 and Vout−ΔV. As described above, since Vref2=VTFT+VEL, it can be said that the comparison circuit 281 is comparing VTFT+VEL and Vout−ΔV.

On the other hand, in Embodiment 2, the comparison circuit 181 compares Vref1 and Vout. As described above, since Vref1=VTFT+VEL+ΔV, it can be said that, in Embodiment 2, the comparison circuit 181 is comparing VTFT+VEL+ΔV and Vout.

Therefore, although the comparison circuit 281 has different comparison subjects as the comparison circuit 181, the comparison result is the same. Specifically, when the voltage drop amount from the output terminal 184 of the variable-voltage source to the detecting points $M_A$ and $M_B$ is the same between Embodiment 2 and Embodiment 3, the voltage outputted by the comparison circuit 181 to the PWM circuit and the voltage outputted by the comparison circuit 281 to the PWM circuit are the same. As a result, the output voltage Vout of the variable-voltage source 180 and the output voltage Vout of the variable-voltage source 280 become the same. Furthermore, the potential difference ΔV and the output voltage Vout also have an increasing function relationship in Embodiment 3.

Compared to the display device 100 according to Embodiment 1, the display device 200 configured in the above manner can regulate the output voltage Vout in accordance with the potential difference ΔV between output voltage of the output terminal 184 and the inter-pixel potential difference between the detecting points $M_A$ and $M_B$ in real-time. This is because, in the display device 100 according to Embodiment 2, the signal processing circuit 160 changes the first reference voltage Vref1 for a frame only at the beginning of each frame period. In contrast, in the display device 200 according to this embodiment, Vout can be regulated independently of the control by the signal processing circuit 260, by inputting the voltage that is dependent on the ΔV, that is, Vout−ΔV directly to the comparison circuit 281 of the variable-voltage source 280 without passing through the signal processing circuit 260.

Next, the operation of the display device 200 configured in the above manner, in the case where the video data inputted up to the Nth frame changes from the N+1th frame onward, as in Embodiment 2, shall be described. It is to be noted that, as in Embodiment 2, it is assumed that, up to the Nth frame, the inputted video data is R:G:B=255:255:255 for the central part of the organic EL display unit 110 and is R:G:B=50:50:50 for the part other than the central part, and, from the N+1th frame onward, the inputted video data is R:G:B=255:255:255 for the central part of the organic EL display unit 110 and is R:G:B=150:150:150 for the part other than the central part.

Figure 16:
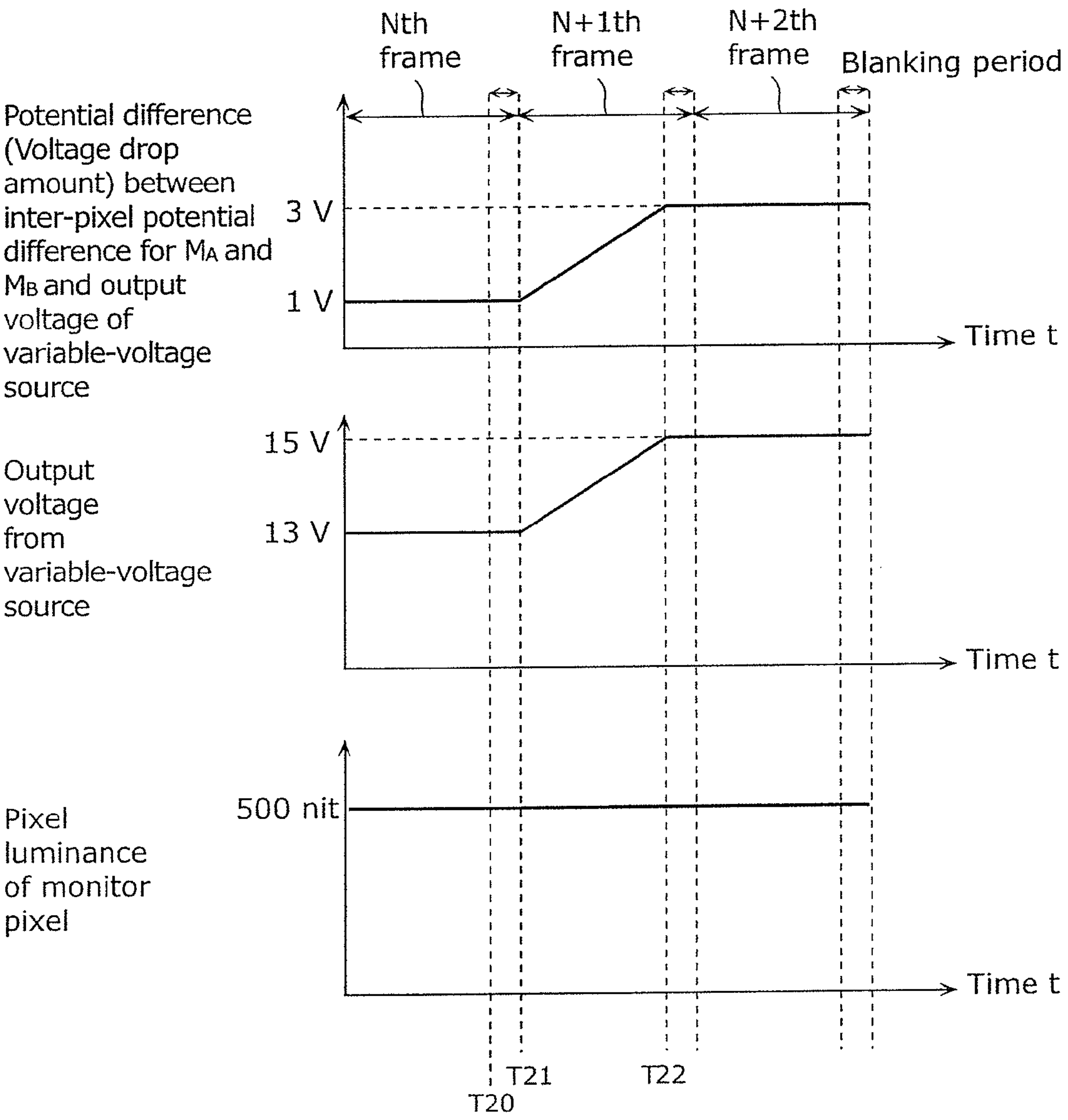
FIG. 16 is a timing chart showing the operation of the display device from an Nth frame to an N+2th frame.

FIG. 16 is a timing chart showing the operation of the display device 200 from the Nth frame to the N+2th frame.

In time t=T20, the peak signal detecting circuit 150 detects the peak value of the video data of the Nth frame. The signal processing circuit 260 determines VTFT+VEL from the peak value detected by the peak signal detecting circuit 150. Here, since the peak value of the video data of the Nth frame is R:G:B=255:255:255, the signal processing circuit 260 uses the required voltage conversion table and determines the required voltage VTFT+VEL for the N+1th frame to be, for example, 12.2 V.

Meanwhile, the output detecting unit 185 constantly detects the inter-pixel potential difference from the inter-pixel potential difference calculating circuit 171.

Next, in time t=T21, the signal processing circuit 260 sets the voltage of the second reference voltage Vref2 to the determined required voltage VTFT+VEL (for example, 12.2 V).

Over a time t=T21 to T22, the image corresponding to the video data of the N+1th frame is gradually displayed on the organic EL display unit 110. At this time, the amount of current supplied by the variable-voltage source 280 to the organic EL display unit 110 gradually increases, as described in Embodiment 1. Therefore, following the increase in the amount of current, the voltage drop in the first power source wire 112 and the voltage rise in the second power source wire 113 gradually increase. In other words the inter-pixel potential difference between the detecting points $M_A$ and $M_B$ gradually increases. Stated differently, the potential difference ΔV gradually increases.

Here, since the error amplifier 186 outputs, in real-time, a voltage that is in accordance with the potential difference between VTFT+VEL and Vout−ΔV, the error amplifier 186 outputs a voltage that causes Vout to rise in accordance with the increase in the potential difference ΔV.

Therefore, with the variable-voltage source 280, Vout rises in real-time in accordance with the potential difference ΔV.

This resolves the shortage of power source voltage for the pixels 111 in the central part of the organic EL display unit 110 which are the pixels 111 in the brightly displayed region. In other words, the drop in pixel luminance is resolved.

As described above, in the display device 200 according to this embodiment, the signal processing circuit 260, and the error amplifier 186, PWM circuit 182, and drive circuit 183 of the variable-voltage source 280, detect the potential difference between inter-pixel potential difference from the inter-pixel potential difference calculating circuit 171 and the predetermined voltage, and regulate the switching element SW in accordance with the detected potential difference. Accordingly, compared with the display device 100 according to Embodiment 1, the display device 200 according to this embodiment is able to regulate the output voltage Vout of the variable-voltage source 280 in real-time in accordance with the voltage drop amount, and thus compared to Embodiment 1, the temporary drop in pixel luminance can be prevented.

It is to be noted that, in this embodiment, the organic EL display unit 110 is the display unit; the inter-pixel potential difference calculating circuit 171 and the output detecting unit 185 are the voltage detecting unit; the signal processing circuit 260, and the error amplifier 186, PWM circuit 182, and drive circuit 183 of the variable-voltage source 280 which are surrounded by the dashed-and-single-dotted line in FIG. 15 are the voltage regulating unit; and the switching element SW, the diode D, the inductor L, and the capacitor C which are surrounded by the dashed-and-double-dotted line in FIG. 15 are the power supplying unit.

It is to be noted that in Embodiments 1 to 3, the output voltage from the variable-voltage source is regulated based on the potential difference between the voltage applied to the pixels and the voltage outputted by the variable-voltage source. In this case, the current path from the variable-voltage source to the pixels includes a wiring path outside the display region and a wiring path inside the display region in which the pixels are disposed. Specifically, in Embodiments 1 to 3, the output voltage from the variable-voltage source is regulated in accordance with the voltage drop amount both inside the display region and outside the display region, by detecting the potential difference between the voltage applied to the pixels and the voltage outputted from the variable-voltage source. In contrast, the output voltage from the variable-voltage source can be regulated in accordance with the voltage drop amount inside the display region only, by detecting the potential difference between the voltage applied to the pixels and the voltage in the wiring path outside the display region. This shall be described below using FIG. 17A and FIG. 17B.

Figure 17A:
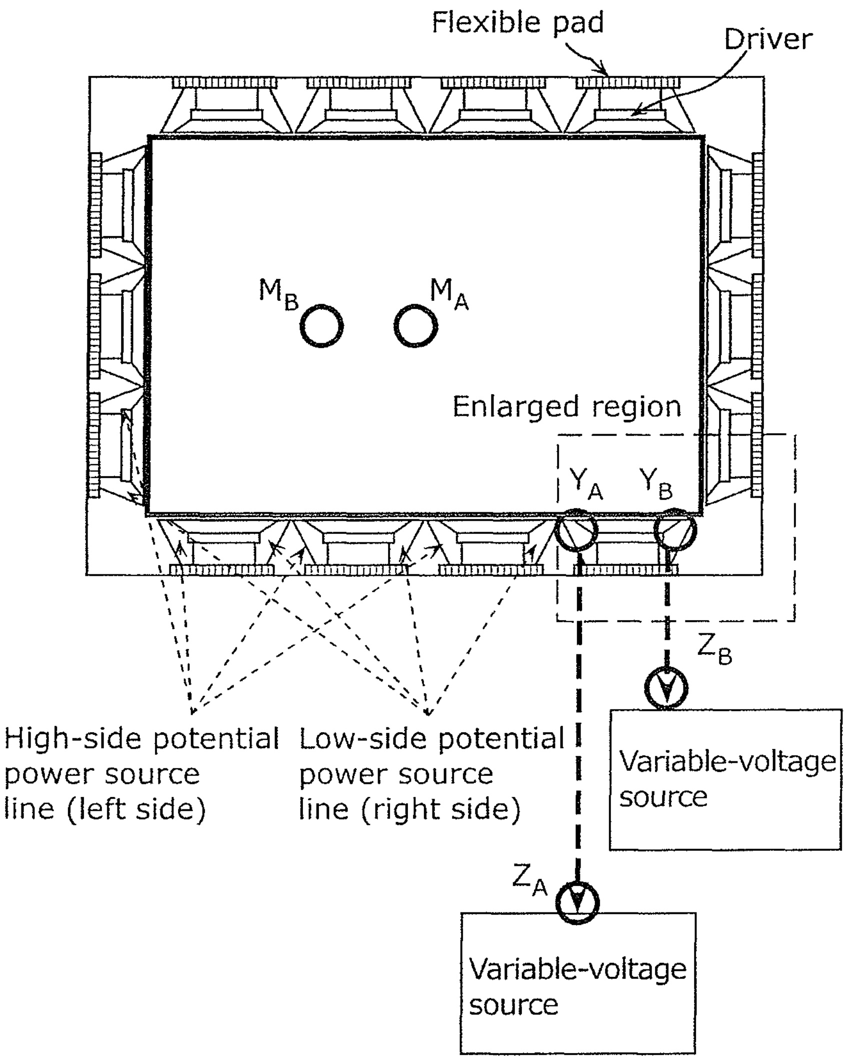
FIG. 17A is an outline diagram of a configuration of a display panel included in a display device according to the present disclosure.
Figure 17B:
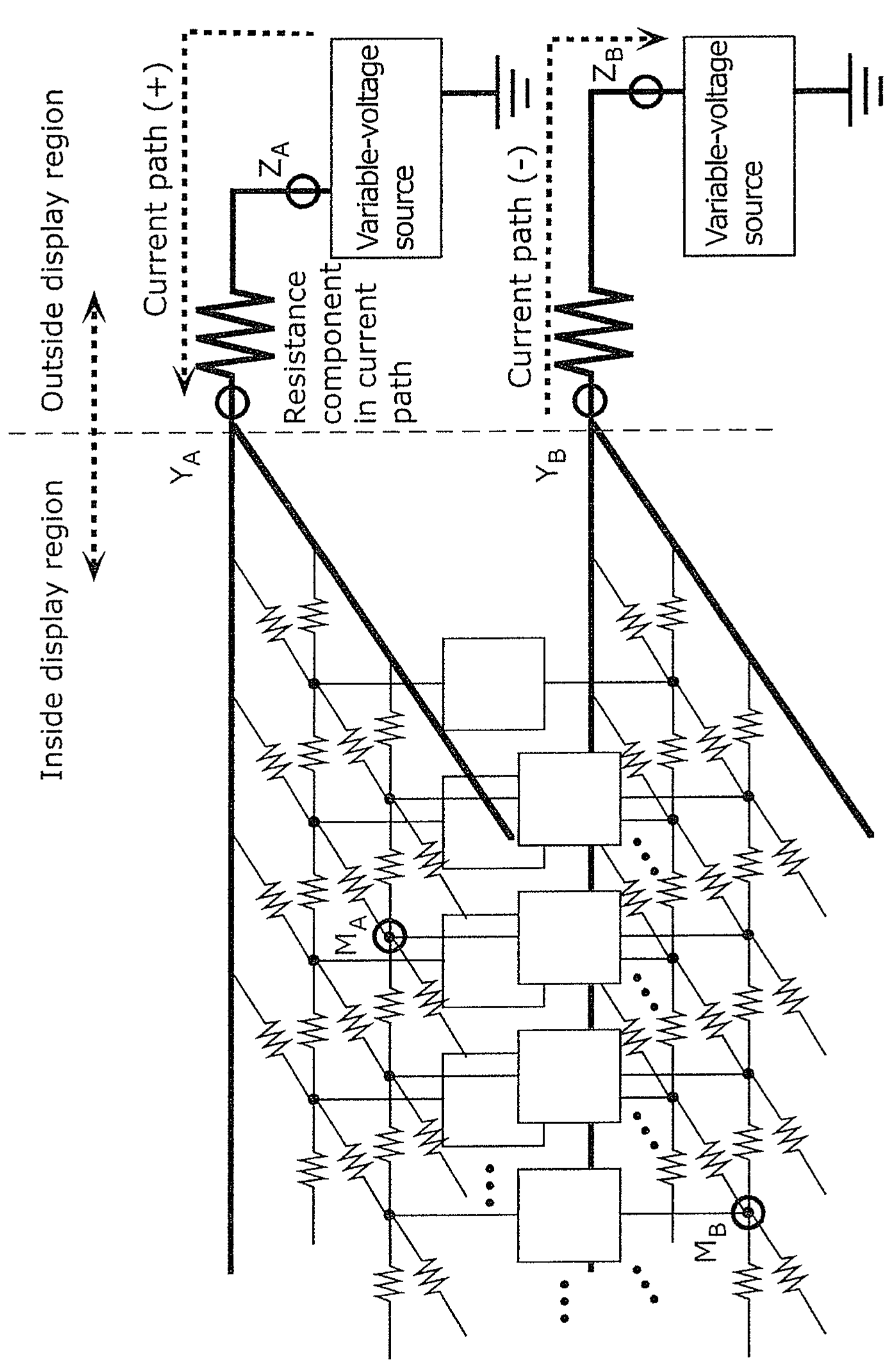
FIG. 17B is perspective diagram schematically showing the vicinity of the periphery of the display panel included in the display device according to the present disclosure.

FIG. 17A is an outline diagram of a configuration of a display panel included in a display device according to the present disclosure. Furthermore, FIG. 17B is perspective diagram schematically showing the vicinity of the periphery of the display panel included in the display device according to the present disclosure. In FIG. 17A, drivers such as write scan driving circuits and data line driving circuits, high-side potential power source lines, low-side potential power source lines, and flexible pads, which are interfaces for electrical connection with outside devices, are disposed in the periphery of the display panel in which pixels 111 are arranged in a matrix (in rows and columns). Each of the variable-voltage sources is connected to the display panel via (i) a high-side potential power source line and a flexible pad or (ii) a low-side potential power source line and a flexible pad. As shown in FIG. 17B, resistance components are also present outside the display region, and such resistance components are due to the aforementioned flexible pads, high-side potential power source lines and low-side potential power source lines.

In Embodiments 1 to 3 described earlier, (i) the inter-pixel potential difference between the potential at the detecting point $M_A$ and the potential at the detecting point $M_B$ and (ii) the power source potential difference between the voltage of high-side potential output point $Z_A$ and the voltage of the low-side potential output point $Z_B$ of the variable-voltage source, and the output voltage of the variable-voltage source is regulated according to the potential difference ΔV between the inter-pixel potential difference and the power source potential difference.

In contrast, for purposes of regulating the output voltage from the variable-voltage source in accordance with the voltage drop amount inside the display region only, it is also acceptable to detect the potential difference between (i) the inter-pixel potential difference between the detecting points $M_A$ and $M_B$ and (ii) a current path potential difference which is the difference of the potentials of the connection point $Y_A$ between the display panel and the high-side potential power source line and the connection point $Y_B$ between the display panel and the low-side potential power source line. With this, the output voltage of the variable-voltage source can regulated in accordance with the voltage drop amount within the display region only.

Embodiment 4

This embodiment describes a display device that monitors the high-side potentials of plural pixels to thereby regulate, to a predetermined potential difference, the potential difference between a high-side potential specified from among the monitored high-side potentials.

Hereinafter, Embodiment 4 of the present disclosure shall be specifically described with reference to the Drawings.

Figure 18:
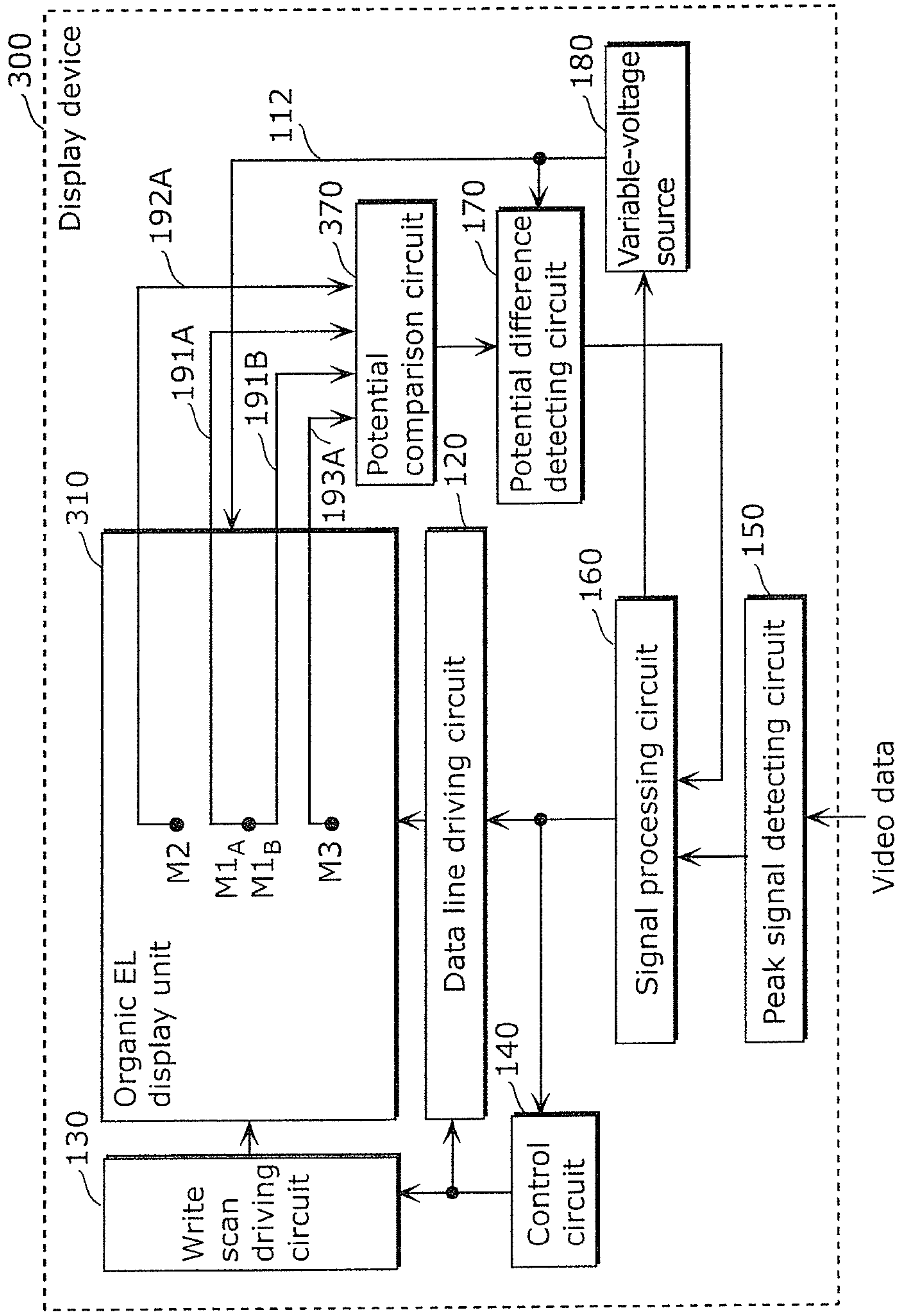
FIG. 18 is a block diagram showing an outline configuration of a display device according to Embodiment 4 of the present disclosure.

FIG. 18 is a block diagram showing an outline configuration of the display device according to Embodiment 4 of the present disclosure. A display device 300 shown in the figure includes an organic EL display unit 310, the data line driving circuit 120, the write scan driving circuit 130, the control circuit 140, the peak signal detecting circuit 150, the signal processing circuit 160, the potential difference detecting circuit 170, the variable-voltage source 180, monitor wires 191A, 191B, 192A, and 193A, and a potential comparison circuit 370.

Compared to the display device 100 according to Embodiment 2, the display device 300 according to this embodiment is different in including monitor wires for detecting the high-side potentials of the pixels, and the potential comparison circuit 370. Description of points identical to those in Embodiment 2 shall not be repeated, and only the points of difference shall be described hereafter.

The organic EL display unit 310 is nearly the same as the organic EL display unit 110, but is different compared to the organic EL display unit 110 in the placement of the monitor wires 191A to 193A for measuring the high-side potential at detecting points $M1_A$, M2, and M3 respectively, and the monitor wire 191B for measuring the low-side potential at a detecting point $M1_B$. It is to be noted that the detecting points $M1_A$ and $M1_B$ are potential measuring points for the high potential side and the low potential side in the same monitor pixel 111M1 for example.

The optimal position of the monitor pixels 111M1 to 111M3 is determined depending on the wiring method of the first power source wire 112 and the second power source wire 113, and the respective values of the first power source wire resistances R1$h$ and R1$v$ and the second power source wire resistances R2$h$ and R2$v$.

Each of the monitor wires 191A, 191B, 192A, and 193A is connected to the corresponding one of the detecting points $M1_A$, $M1_B$, M2, and M3, and to the potential comparison circuit 370, and transmits the potential of the corresponding detecting point to the potential comparison circuit 370.

The potential comparison circuit 370 measures, via each of the monitor wires 191A, 191B, 192A, and 193A, the potential of the corresponding detecting point. Stated differently, the potential comparison circuit 370 measures the high-side potential applied to the monitor pixels 111M1 to 111M3 and the low-side potential applied to the monitor pixel 111M1. In addition, the potential comparison circuit 370 selects the lowest potential among the measured high-side potentials at the detecting points $M1_A$, M2, and M3, and outputs the selected potential to the potential difference detecting circuit 170. It is to be noted that, when there are plural low-side potentials measured, the potential comparison circuit 370 selects the highest one of such potentials, and outputs the selected potential to the potential difference detecting circuit 170. In this embodiment, there is one measured low-side potential, and thus that potential is directly outputted to the potential difference detecting circuit 170.

The potential difference detecting circuit 170, which in the this embodiment is the voltage detecting unit, receives, from the potential comparison circuit 370, the lowest potential from among the measured high-side potentials at the detecting points $M1_A$, M2, and M3 and the low-side potential at the detecting point $M1_B$. Subsequently, the potential difference detecting circuit 170 calculates the inter-pixel potential difference between the lowest potential from among the measured high-side potentials at the detecting points $M1_A$, M2, and M3 and the low-side potential at the detecting point $M1_B$. In addition, the potential difference detecting circuit 170 measures the output voltage of the variable-voltage source 180, and measures the potential difference LW between such output voltage and the calculated inter-pixel potential difference. Subsequently, the potential difference detecting circuit 170 outputs the measured potential difference ΔV to the signal processing circuit 160.

The signal processing unit 160 regulates the variable-voltage source 180 based on the potential difference ΔV. As a result, the variable-voltage source 180 provides, to the organic EL display unit 310, an output voltage Vout with which dropping of luminance does not occur in any of the monitor pixels 111M1 to 111M3.

As described above, in the display device 300 according to this embodiment, the potential comparison circuit 370 measures the high-side potential applied to each of the pixels 111 inside the organic EL display unit 310, and selects the lowest potential among the measured high-side potentials. Furthermore, the potential comparison circuit 370 measures the low-side potential applied to each of the pixels 111 inside the organic EL display unit 310, and selects the highest potential among the measured low-side potentials. In addition, the potential difference detecting circuit 170 detects the potential difference ΔV between (i) the inter-pixel potential difference between the lowest high-side potential and the highest low-side potential which are selected by the potential comparison circuit 370 and (ii) the output voltage Vout of the variable-voltage source 180. Then, the signal processing circuit 160 regulates the variable-voltage source 180 in accordance with the potential difference ΔV.

With this, the output voltage Vout of the variable-voltage source 180 can be more appropriately regulated. Therefore, power consumption can be effectively reduced even when the size of the organic EL display unit is increased.

It is to be noted that, in the display device 300 according to this embodiment: the variable-voltage source 180 is the power supplying unit; the organic EL display unit 310 is the display unit; one part of the potential comparison circuit 370 is the voltage detecting unit; and the other part of the potential comparison circuit 370, the potential difference detecting circuit 170, and the signal processing circuit 160 are the voltage regulating unit.

Furthermore, although the potential comparison circuit 370 and the potential difference detecting circuit 170 are provided separately in the display device 300, a potential comparison circuit which compares the output voltage Vout of the variable-voltage source 180 and the potential at each of the detecting points $M1_A$, M2, and M3 may be provided in place of the potential comparison circuit 370 and the potential difference detecting circuit 170.

Next, the advantageous effects produced by the display device 300 according to this embodiment shall be described.

Figure 19:
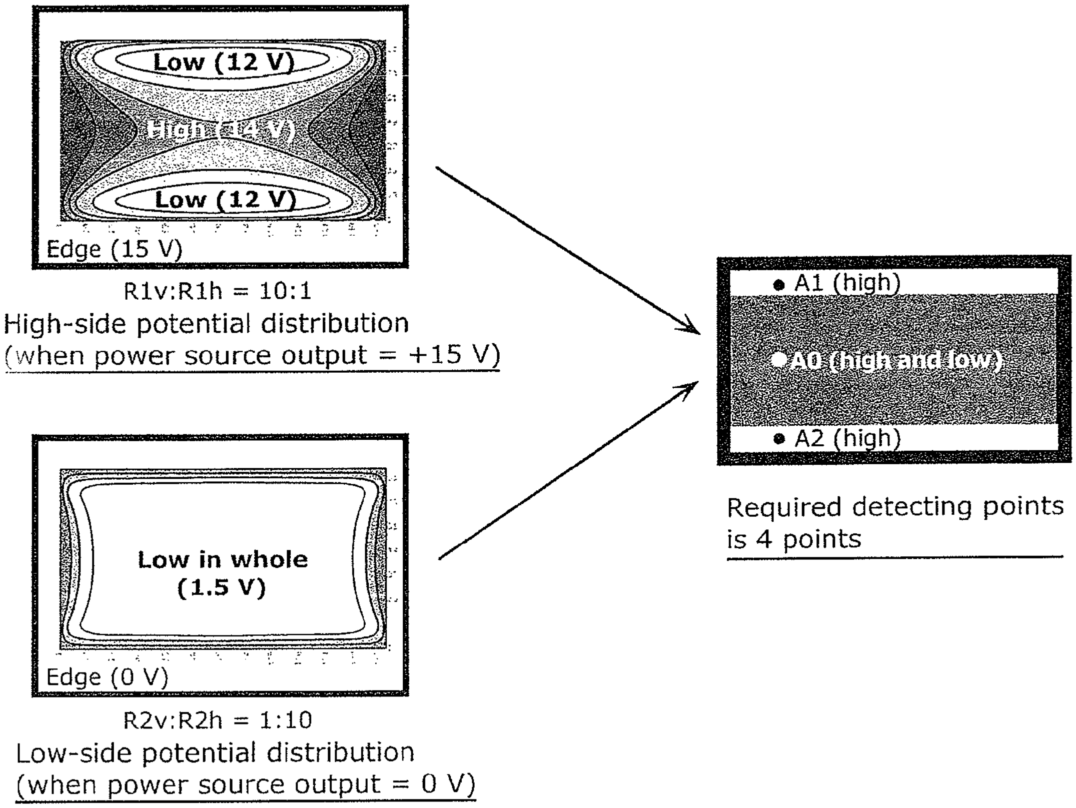
FIG. 19 is a diagram showing potential distributions and a detection point arrangement for the display device according to Embodiment 4 of the present disclosure.

FIG. 19 is a diagram showing potential distributions and the detection point arrangement for the display device in Embodiment 4 of the present disclosure. The diagrams on the left side of FIG. 19 show the potential distributions when the 15 V is applied as the high-side potential power source output and 0 V, which is a grounding potential, is applied as the low-side potential power source output. Since a 1:10 ratio is assumed between the first power source wire resistance R1*h* and the first power source resistance R1V, the high-side potential distribution shows a severe potential change in the vertical direction of the display panel. In contrast, since a 10:1 ratio is assumed between the second power source wire resistance R2*h* and the second power source resistance R2V, the low-side potential distribution shows a small potential change over the entire display panel. In other words, the low-side potential distribution has a tendency to be approximately uniform within the display screen. Furthermore, it is assumed that the voltage required to saturate the pixels is 10 V.

With such display tendencies, consider, for example, the case of regulating the output voltage of the variable-voltage source by detecting the potential difference between the high-side potential and the low-side potential of only a pixel A0 disposed at the center of the display panel.

In the diagrams on the left side of FIG. 19, the places at which the potential difference between the high-side potential and the low-side potential is smallest are the positions close to the upper and lower edges of the display panel, and the potential difference in these positions is approximately 10.5 V (12 V-1.5 V). Therefore, ideally, the voltage that can be reduced is 0.5 V (10.5 V-required voltage 10 V).

However, when the detecting point is only the pixel A0 located at the center point of the display panel, the inter-pixel potential to be measured is detected as 12.5 V (14 V-1.5 V). As a result, the voltage that can be reduced is erroneously detected as being 2.5 V (12.5 V-required voltage 10 V).

In order to prevent such erroneous detection, pixels for detecting the high-side potential are set at the 3 positions of the pixels A0 to A2 shown in the diagram on the right side of FIG. 19, and the pixel for detecting the low-side potential is set at the single position of the pixel A0. By providing a detecting point at these four positions in total, the smallest inter-pixel potential difference is known, and thus erroneous detection can be prevented.

Furthermore, when the detection of the reducible voltage that can be reduced is to be performed accurately without the above-described erroneous detection, using the conventional method, the high-side potential and the low-side potential are detected using always the same pixel, and thus it is necessary to measure the high-side potential and the low-side potential at the pixels A0 to A2, and thus measurements at a total of 6 points becomes necessary.

In contrast, the display device 300 according to Embodiment 4 of the present disclosure has the advantage of ideally requiring the provision of only four detection points because the one pixel from among the pixels for detecting the high-side potentials and the pixel for detecting the low-side potential are different pixels.

Therefore, by monitoring the potential of different pixels for the high-side potential and the low-side potential, it is possible to avoid excessive power source voltage reduction due to erroneous detection, and the accuracy of power-saving control can be enhanced using a minimal number of detecting points.

It is to be noted that although three detecting points are illustrated in the figure as high-side potential measuring points, it is sufficient to have more than one of these detecting points and the optimal positioning and number of points may be determined in accordance with the wiring method of the power source wires and the wire resistance values.

Although the display device according to the present disclosure has been described thus far based on the embodiments, the display device according to the present disclosure is not limited to the above-described embodiments. Modifications that can be obtained by executing various modifications to Embodiments 1 to 3 that are conceivable to a person of ordinary skill in the art without departing from the essence of the present disclosure, and various devices internally equipped with the display device according to the present disclosure are included in the present disclosure.

For example, the drop in the pixel luminance of the pixel to which the monitor wire inside the organic EL display unit is provided may be compensated.

Figure 20:
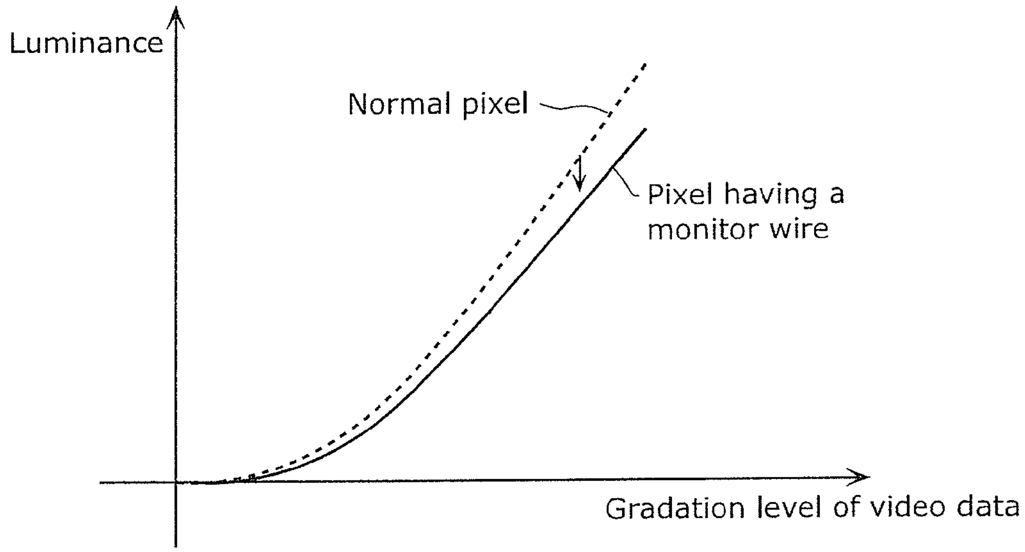
FIG. 20 is a graph showing pixel luminance of a normal pixel and pixel luminance of a pixel having the monitor wire, which correspond to the gradation levels of video data.

FIG. 20 is a graph showing the pixel luminance of a normal pixel and the pixel luminance of a pixel having the monitor wire, which correspond to the gradation levels of video data. It is to be noted that a normal pixel refers to a pixel among the pixels of the organic EL display unit, other than the pixel provided with a monitor wire.

Figure 21:
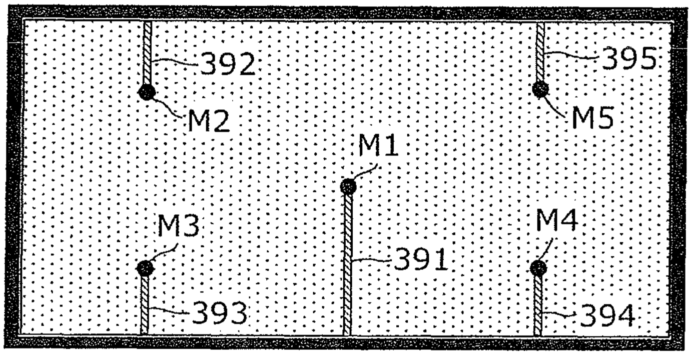
FIG. 21 is a diagram schematically showing an image in which line defects occur.

As is clear from the figure, when the gradation levels of the video data are the same, the luminance of the pixel having the monitor wire drops more than the luminance of the normal pixel. This is because, with the provision of a monitor wire, the capacitance value of the holding capacitor 126 of the pixel decreases. Therefore, even when video data which causes luminance to be produced with the same luminance evenly throughout the entirety of the organic EL display unit is inputted, the image to be displayed on the organic EL display unit is an image in which the luminance of the pixels having a monitor wire is lower than the luminance of the other pixels. In other words, line defects occur. FIG. 21 is a diagram schematically showing an image in which line defects occur.

In order to prevent line defects, the display device may correct the signal voltage applied to the organic EL display unit from the data line driving circuit 120. Specifically, since the positions of the pixels having a monitor wire are known at the time of designing, it is sufficient to pre-set the signal voltage to be provided to the pixels in such locations to be higher by the amount of drop in luminance. With this, it is possible to prevent line defects caused by the provision of monitor wires.

Furthermore, although the signal processing circuit has the required voltage conversion table indicating the required voltage VTFT+VEL corresponding to the gradation levels of each color, the signal processing circuit may have, in place of the required voltage conversion table, the current-voltage characteristics of the driving transistor 125 and the current-voltage characteristics of the organic EL element 121, and determine VTFT+VEL by using these two current-voltage characteristics.

Figure 22:
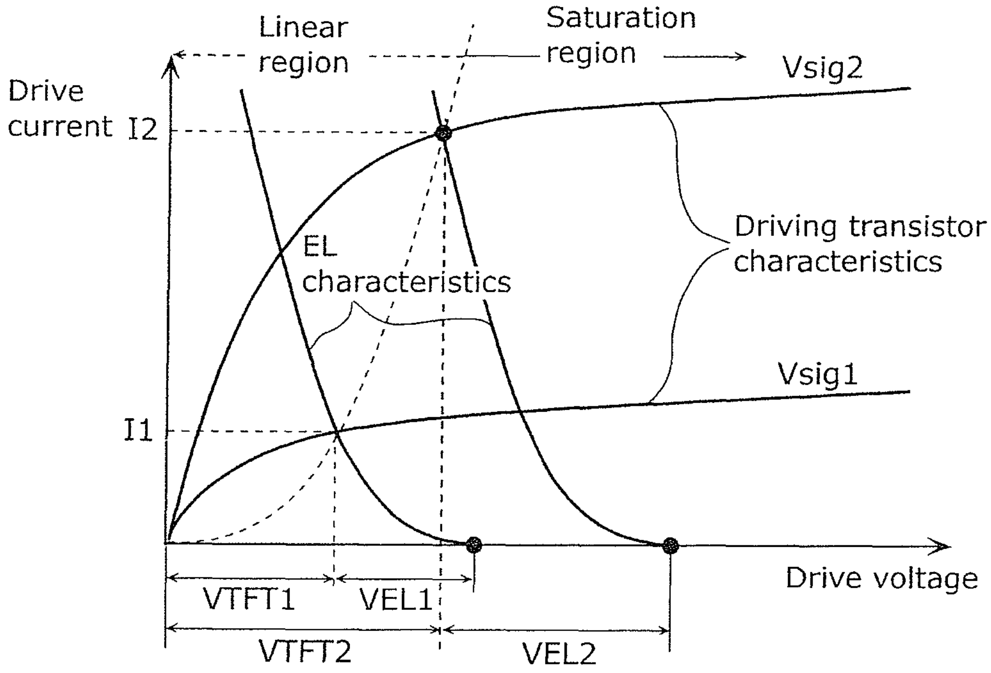
FIG. 22 is a graph showing together current-voltage characteristics of a driving transistor and current-voltage characteristics of an organic EL element.

FIG. 22 is a graph showing together the current-voltage characteristics of the driving transistor and the current-voltage characteristics of the organic EL element. In the horizontal axis, the direction of dropping with respect to the source potential of the driving transistor is the normal direction.

In the figure, current-voltage characteristics of the driving transistor and current-voltage characteristics of the organic EL element which correspond to two different gradation levels are shown, and the current-voltage characteristics of the driving transistor corresponding to a low gradation level is indicated by Vsig1 and the current-voltage characteristics of the driving transistor corresponding to a high gradation level is indicated by Vsig2.

In order to eliminate the impact of display defects due to changes in the source-to-drain voltage of the driving transistor, it is necessary to cause the driving transistor to operate in the saturation region. On the other hand, the pixel luminescence of the organic EL element is determined according to the drive current. Therefore, in order to cause the organic EL element to produce luminescence precisely in accordance with the gradation level of video data, it is sufficient that the voltage remaining after the drive voltage (VEL) of the organic EL element corresponding to the drive current of the organic EL element is deducted from the voltage between the source electrode of the driving transistor and the cathode electrode of the organic EL element is a voltage that can cause the driving transistor to operate in the saturation region. Furthermore, in order to reduce power consumption, it is preferable that the drive voltage (VTFT) of the driving transistor be low.

Therefore, in FIG. 22, the organic EL element produces luminescence precisely in accordance with the gradation level of the video data and power consumption can be reduced most with the VTFT+VEL that is obtained through the characteristics passing the point of intersection of the current-voltage characteristics of the driving transistor and the current-voltage characteristics of the organic EL element on the line indicating the boundary between the linear region and the saturation region of the driving transistor.

In this manner, the required voltage VTFT+VEL corresponding to the gradation levels for each color may be calculated using the graph shown in FIG. 22.

With this, power consumption can be further reduced.

It is to be noted that although the respective display devices in Embodiments 1 to 4 have a configuration in which a peak signal detecting circuit is provided, taken from the viewpoint of operating the driving transistor in the saturation region, it is possible to cause the organic EL element to produce luminescence precisely even without the peak signal detecting circuit, by storing the voltage (VTFT+VEL) at the peak gradation level in a memory beforehand, as in Embodiment 1, and setting the voltage (VTFT+VEL) as the reference voltage at all times.

Furthermore, in Embodiment 1, the voltage margin setting unit 175 outputs, to the variable-voltage source 180, the reference voltage Vref1A to which the potential difference ΔV detected by the potential difference detecting circuit 170 is added. In contrast, the display device 50 according to Embodiment 1 may be configured without a potential difference detecting circuit and with the potential of the detecting point M1 being inputted directly to the variable-voltage source 180, as in the display device 200 according to Embodiment 3. Even with this configuration, it is possible to produce the same advantageous effects as with the display device 50 according to Embodiment 1.

Furthermore, in Embodiment 2, the signal processing circuit may change the first reference voltage Vref1 on a plural frame (for example, a 3-frame) basis instead of changing the first reference voltage Vref1 on a per frame basis.

With this, the power consumption occurring in the variable-voltage source 180 can be reduced because the potential of the first reference voltage Vref1 fluctuates.

Furthermore, the signal processing circuit may measure the potential differences outputted from the potential difference detecting circuit and the potential comparison circuit over plural frames, average the measured potential differences, and regulate the variable-voltage source in accordance with the average potential difference. Specifically, the process of detecting the potential at the detecting point (step S14) and the process of detecting the potential difference (step S15) in the flowchart shown in FIG. 12 may be executed over plural frames, and the potential differences for the plural frames detected in the process of detecting the potential difference (step S15) may be averaged in the process of determining the voltage margin (step S16), and the voltage margin may be determined in accordance with the average potential difference.

Furthermore, the signal processing circuit may determine the first reference voltage Vref1 and the second reference voltage Vref2 with consideration being given to an aged deterioration margin for the organic EL element 121. For example, assuming that the aged deterioration margin for the organic EL element 121 is Vad, the signal processing circuit 160 may determine the voltage of the first reference voltage Vref1 to be VTFT+VEL+Vdrop+Vad, and the signal processing circuit 260 may determine the voltage of the second reference voltage Vref2 to be VTFT+VEL+Vad.

Furthermore, although the switch transistor 124 and the driving transistor 125 are described as being P-type transistors in the above-described embodiments, they may be configured of N-type transistors.

Furthermore, although the switch transistor 124 and the driving transistor 125 are TFTs, they may be other field-effect transistors.

Furthermore, the processing units included in the display devices 50, 100, 200, and 300 according to the corresponding embodiments described earlier are typically implemented as an LSI which is an integrated circuit. It is to be noted that part of the processing units included in the display devices 50, 100, 200, and 300 can also be integrated in the same substrate as the organic EL display units 110 and 310. Furthermore, they may be implemented as a dedicated circuit or a general-purpose processor. Furthermore, a Field Programmable Gate Array (FPGA) which allows programming after LSI manufacturing or a reconfigurable processor which allows reconfiguration of the connections and settings of circuit cells inside the LSI may be used.

Furthermore, part of the functions of the data line driving circuit, the write scan driving circuit, the control circuit, the peak signal detecting circuit, the signal processing circuit, and the potential difference detecting circuit included in the display devices 50, 100, 200, and 300 according to the corresponding embodiments of the present disclosure may be implemented by having a processor such as a CPU execute a program. Furthermore, one or more exemplary embodiments of the present disclosure may also be implemented as a display device driving method including the characteristic steps implemented through the respective processing units included in the display devices 50, 100, 200, and 300.

Furthermore, although the foregoing descriptions exemplify the case where the display devices 50, 100, 200, and 300 are active-matrix organic EL display devices, one or more exemplary embodiments of the present disclosure may be applied to organic EL display devices other than that of the active-matrix type, and may be applied to a display device other than an organic EL display device using a current-driven luminescence element, such as a liquid crystal display device.

Figure 23:
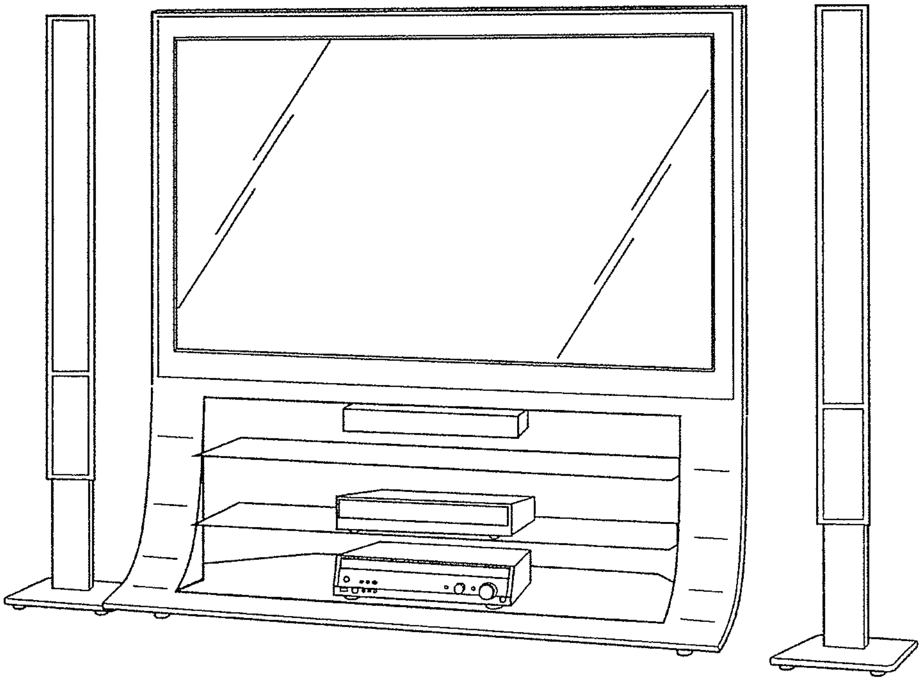
FIG. 23 is an external view of a thin flat-screen TV incorporating the display device according to the present disclosure.

Furthermore, for example, the display device according to one or more exemplary embodiments of the present disclosure is built into a thin flat-screen TV such as that shown in FIG. 23. A thin, flat-screen TV capable of high-accuracy image display reflecting a video signal is implemented by having the display device according to one or more exemplary embodiments of the present disclosure built into the TV.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

One or more exemplary embodiments of the present disclosure are particularly useful as an active-type organic EL flat panel display.

The invention claimed is:

1. A display device, comprising:

a power supplying unit configured to output a high-side output potential and a low-side output potential;

a display unit in which a plurality of pixels are arranged and which receives power supply from the power supplying unit;

a voltage detecting unit configured to detect a high-side applied potential applied to a first pixel in the display unit and a low-side applied potential applied to a second pixel in the display unit, the second pixel being different from the first pixel; and a voltage regulating unit configured to regulate at least one of the high-side output potential and the low-side output potential outputted from the power supplying unit such that a potential difference between the high-side applied potential and the low-side applied potential reaches a predetermined potential difference, wherein each of the pixels includes a driver and a luminescent element, the predetermined potential difference is a potential difference expressed as VTFT+VEL−ΔV+Vdrop, where VTFT is a voltage required by the driver, VEL is a voltage required by the luminescent element, ΔV is a potential difference between a potential output by the power supply and a potential of a pixel detected by the voltage detecting unit, and Vdrop is a voltage margin corresponding to ΔV.

2. The display device according to claim 1, wherein at least one of (i) the number of pixels for which the voltage detecting unit detects the high-side applied potential and (ii) the number of pixels for which the voltage detecting unit detects the low-side applied potential is plural.

3. The display device according to claim 2, wherein the voltage regulating unit is configured to:

select at least one applied potential from among:

a lowest applied potential among high-side applied potentials detected by the voltage detecting unit; and a highest applied potential among low-side applied potentials detected by the voltage detecting unit; and regulate the power supplying unit based on the selected at least one applied potential.

4. The display device according to claim 1, wherein the voltage detecting unit is further configured to detect at least one of the high-side output potential and the low-side output potential which are outputted by the power supplying unit, and the voltage regulating unit is configured to receive inputs of a power source potential difference which is a potential difference between the high-side output potential and the low-side output potential and a pixel potential difference which is a potential difference between the high-side applied potential and the low-side applied potential, and regulate at least one of the high-side output potential and the low-side output potential in accordance with a potential difference between the power source potential difference and the pixel potential difference, the high-side output potential and the low-side output potential being outputted by the power supplying unit, the high-side applied potential being applied to the first pixel, and the low-side applied potential being applied to the second pixel.

5. The display device according to claim 4, wherein the voltage regulating unit is configured to regulate the power supplying unit so that (i) the potential difference between the power source potential difference and the pixel potential difference and (ii) the power source potential difference are in an increasing function relationship.

6. The display device according to claim 1, wherein the voltage detecting unit is further configured to detect at least one of (i) a potential in a high-side potential current path connecting the power supplying unit and a high potential side of the pixels and (ii) a potential in a low-side potential current path connecting the power supplying unit and the low potential side of the pixels; and the voltage regulating unit is configured to regulate at least one of the high-side output potential and the low-side output potential that are outputted from the power supplying unit, in accordance with a first potential difference which is at least one of (i) a potential difference between the potential in the high-side potential current path and the high-side applied potential applied to the first pixel and (ii) a potential difference between the potential in the low-side potential current path and the low-side applied potential applied to the second pixel.

7. The display device according to claim 6, wherein the voltage regulating unit is configured to regulate the power supplying unit so that the power source potential difference and the first potential difference are in an increasing function relationship.

8. The display device according to claim 1, wherein the driver having a source electrode and a drain electrode; and the luminescence element having a first electrode and a second electrode, the first electrode being connected to one of the source electrode and the drain electrode of the driver, the high-side applied potential is applied to one of the second electrode and the other of the source electrode and the drain electrode, and the low-side applied potential is applied to the other of the second electrode and the other of the source electrode and the drain electrode.

9. The display device according to claim 8, wherein the pixels are arranged in rows and columns;

the display device further includes a first power source line and a second power source line, the first power source line connecting the others of the source electrode and the drain electrode of the respective drivers of adjacent pixels in at least one of the row direction and the column direction, and the second power source line connecting the second electrodes of the respective luminescence elements of adjacent pixels in the row direction and the column direction; and the pixels receive the power supply from the power supplying unit via the first power source line and the second power source line.

10. The display device according to claim 9, wherein the second electrode and the second power source line are part of a common electrode that is common to the pixels, and are electrically connected to the power supplying unit so that a potential is applied to the common electrode from a periphery of the common electrode.

11. The display device according to claim 10, wherein the second electrode comprises a transparent conductive material including a metal oxide.

12. The display device according to claim 8, wherein the luminescence element is an organic electroluminescence (EL) element.

13. The display device according to claim 1 further comprising at least one of:

a high-side potential detecting line having one end connected to the first pixel and the other end connected to the voltage detecting unit, for transmitting the high-side applied potential to the voltage detecting unit; and a low-side potential detecting line having one end connected to the second pixel and the other end connected to the voltage detecting unit, for transmitting the low-side applied potential to the voltage detecting unit.

* * * * *